(12) United States Patent
Shell

(10) Patent No.: US 11,083,205 B2
(45) Date of Patent: Aug. 10, 2021

(54) AUGER TYPE POULTRY CHILLERS WITH ENHANCED HANGER BEARING CONFIGURATIONS AND RELATED ASSEMBLIES

(71) Applicant: Morris & Associates, Inc., Garner, NC (US)

(72) Inventor: John P. Shell, Raleigh, NC (US)

(73) Assignee: Morris & Associates, Inc., Garner, NC (US)

( * ) Notice: Subject to any disclaimer, the term of this patent is extended or adjusted under 35 U.S.C. 154(b) by 0 days.

(21) Appl. No.: 16/747,165

(22) Filed: Jan. 20, 2020

(65) Prior Publication Data

US 2020/0146302 A1     May 14, 2020

Related U.S. Application Data

(63) Continuation of application No. 16/198,215, filed on Nov. 21, 2018, now Pat. No. 10,537,112, which is a (Continued)

(51) Int. Cl.
    *A22B 5/00*          (2006.01)
    *B65G 33/04*       (2006.01)
    (Continued)

(52) U.S. Cl.
    CPC ............ *A22B 5/0076* (2013.01); *A22C 21/00* (2013.01); *A23B 4/062* (2013.01); *B65G 33/04* (2013.01);
    (Continued)

(58) Field of Classification Search
    CPC ........ B65G 33/04; B65G 33/32; B65G 33/26; A22B 5/0076; A23B 4/062; F25D 13/065; F28F 5/06; A22C 21/00
    (Continued)

(56) References Cited

U.S. PATENT DOCUMENTS

| | | | |
|---|---|---|---|
| 1,729,211 | A | 9/1929 | Erisman |
| 1,761,591 | A | 6/1930 | Ryder |
| | | (Continued) | |

FOREIGN PATENT DOCUMENTS

| | | |
|---|---|---|
| GB | 2510028 | 7/2014 |
| JP | 10218336 | 8/1998 |

OTHER PUBLICATIONS

International Search Report and Written Opinion for PCT/US2016/046168 dated Jan. 31, 2017, 20 pages.

(Continued)

*Primary Examiner* — James R Bidwell
(74) *Attorney, Agent, or Firm* — Myers Bigel, P.A.

(57) ABSTRACT

A poultry chiller includes a tank and an auger rotatably held in the tank. The auger includes a first auger section and a second auger section. The first auger section includes a first auger shaft and a first auger flight. The first auger flight includes a first helical portion on the first auger shaft and a first flight extension that extends away from the first helical portion. The second auger section includes a second auger shaft coupled to the first auger shaft and a second auger flight. The second auger flight includes a second helical portion on the second auger shaft and a second flight extension that extends away from the second helical portion. The chiller includes a hanger bearing assembly between the first and second auger sections and extending to an upper portion of the tank.

22 Claims, 24 Drawing Sheets

Related U.S. Application Data continuation-in-part of application No. 15/663,205, filed on Jul. 28, 2017, now Pat. No. 10,226,052, which is a continuation of application No. 15/232,445, filed on Aug. 9, 2016, now Pat. No. 9,717,256.

(60) Provisional application No. 62/203,207, filed on Aug. 10, 2015, provisional application No. 62/300,527, filed on Feb. 26, 2016, provisional application No. 62/589,064, filed on Nov. 21, 2017.

(51) Int. Cl.
*A23B 4/06* (2006.01)
*A22C 21/00* (2006.01)
*F25D 13/06* (2006.01)
*F28F 5/06* (2006.01)
*B65G 33/32* (2006.01)
*B65G 33/26* (2006.01)

(52) U.S. Cl.
CPC .............. *F25D 13/065* (2013.01); *F28F 5/06* (2013.01); *B65G 33/26* (2013.01); *B65G 33/32* (2013.01)

(58) Field of Classification Search
USPC ........................................................ 198/666
See application file for complete search history.

(56) References Cited

U.S. PATENT DOCUMENTS

| | | |
|---|---|---|
| 2,279,201 A | 4/1942 | Kozak et al. |
| 2,864,593 A | 12/1958 | Shoup |
| 4,025,131 A | 5/1977 | Bergquist et al. |
| 4,645,067 A | 2/1987 | George |
| 5,868,000 A | 2/1999 | Morris, Jr. et al. |
| 6,722,490 B1 | 4/2004 | Bass |
| 6,951,273 B2 | 10/2005 | Bass |
| 7,051,865 B1 | 5/2006 | Zhao et al. |
| 7,748,479 B2 | 7/2010 | Barbera |
| 8,136,654 B2 | 3/2012 | Moreland et al. |
| 8,403,128 B2 | 3/2013 | Farrell et al. |
| 8,863,450 B2 | 10/2014 | Anderson et al. |
| 9,717,256 B2 | 8/2017 | Shell |
| 10,226,052 B2 | 3/2019 | Shell |
| 10,537,112 B2 * | 1/2020 | Shell .................... F25D 13/065 |
| 2012/0261236 A1 | 10/2012 | Farrell et al. |
| 2014/0150302 A1 | 6/2014 | Mast et al. |

OTHER PUBLICATIONS

Invitation to Pay Additional Fees and Partial Search Report for PCT/US2016/046168 dated Nov. 17, 2016, 7 pages.
Declaration of David Maw, dated Aug. 5, 2016, 3 pages.

\* cited by examiner

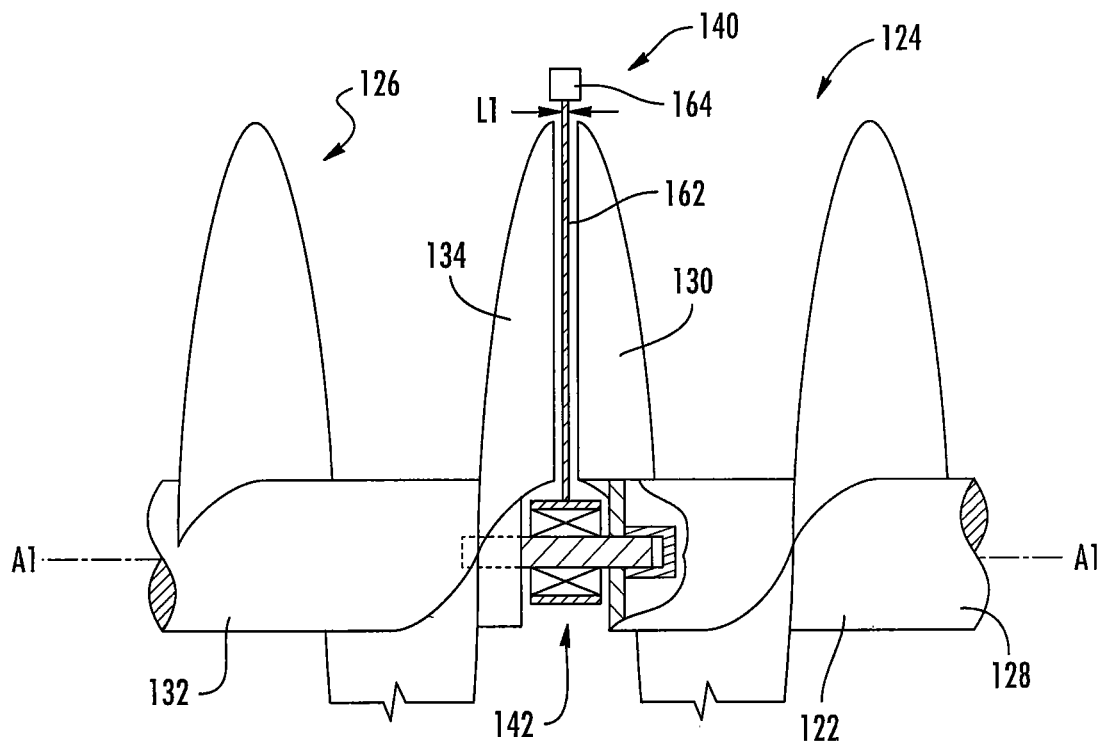
FIG. 7
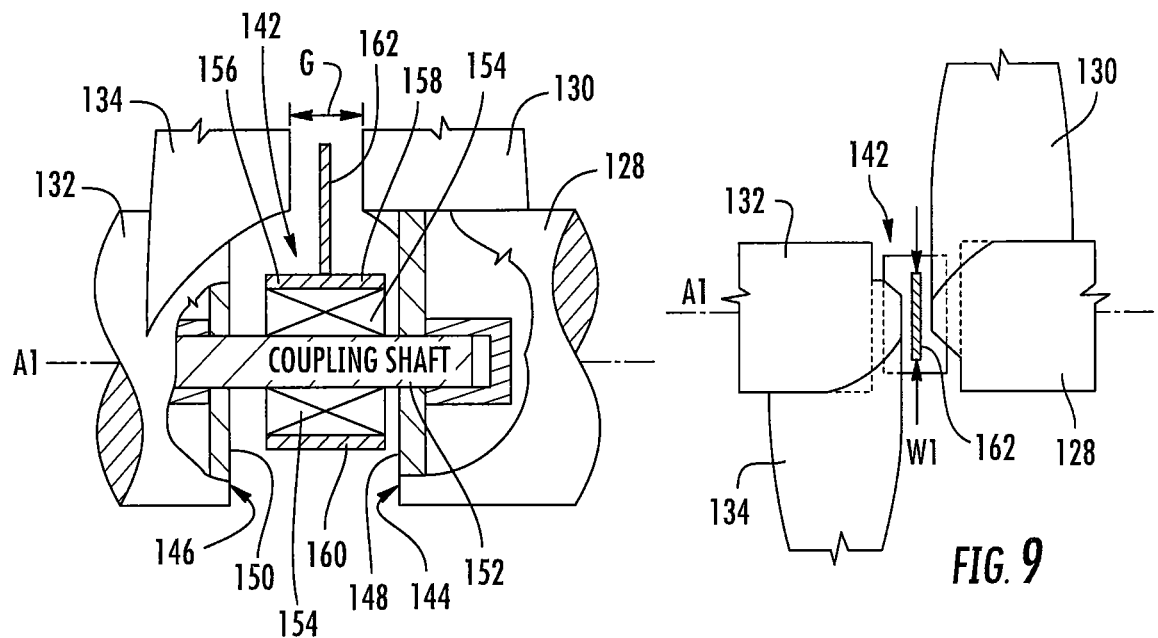
FIG. 8
FIG. 9

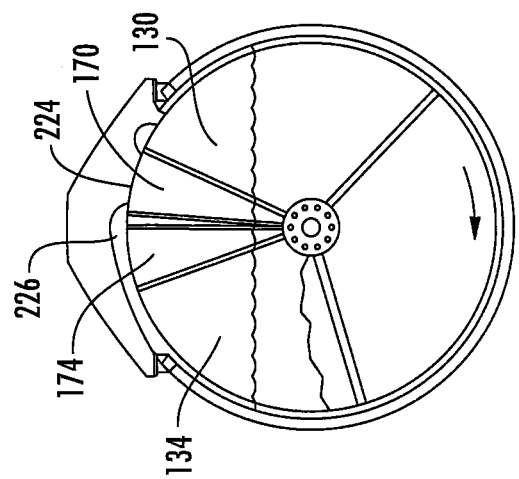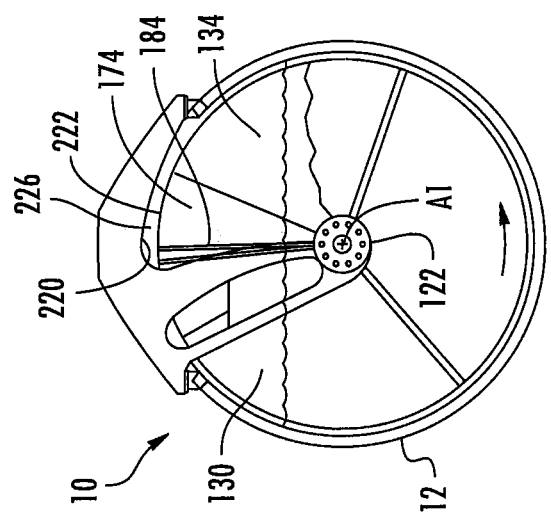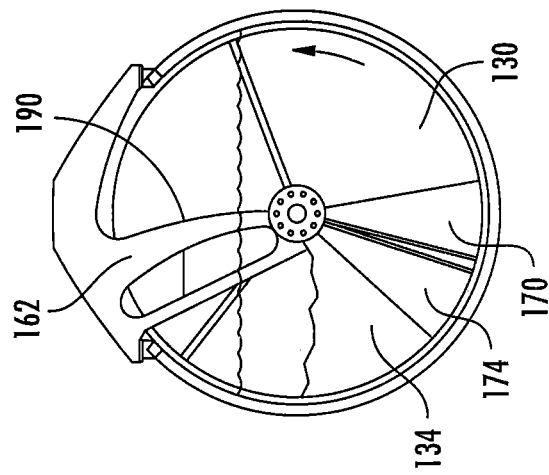

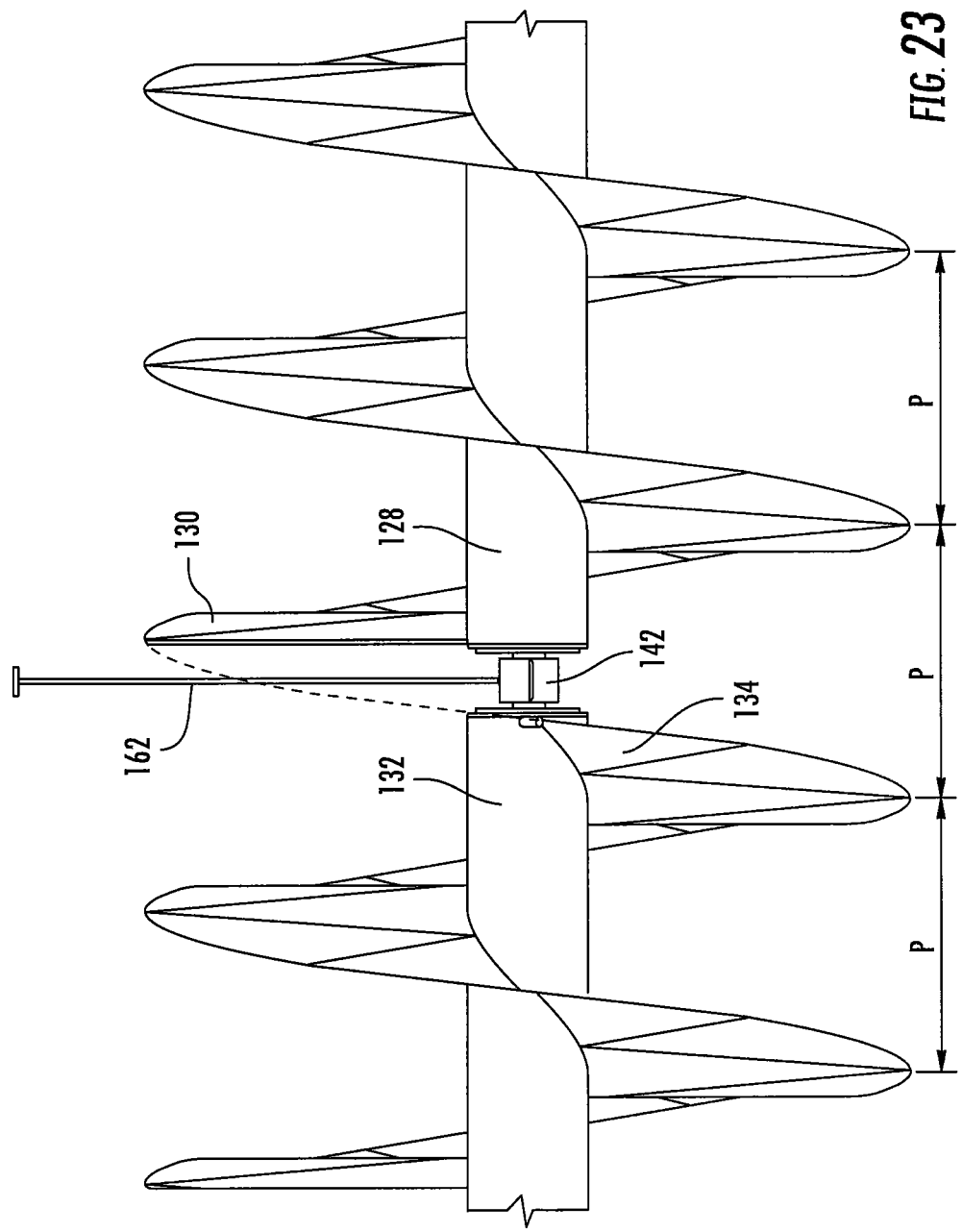

AUGER TYPE POULTRY CHILLERS WITH ENHANCED HANGER BEARING CONFIGURATIONS AND RELATED ASSEMBLIES

RELATED APPLICATIONS

This application is a continuation of U.S. application Ser. No. 16/198,215, filed Nov. 21, 2018, which application is a continuation-in-part of U.S. application Ser. No. 15/663,205, filed Jul. 28, 2017, which application is a continuation of U.S. patent application Ser. No. 15/232,445, filed Aug. 9, 2016, now U.S. Pat. No. 9,717,256, which application claims priority to U.S. Provisional Application No. 62/203,207, filed Aug. 10, 2015, and also claims priority to U.S. Provisional Application No. 62/300,527, filed Feb. 26, 2016, the disclosure of each of which is incorporated by reference in its entirety. This application also claims priority to U.S. Provisional Application No. 62/589,064, filed Nov. 21, 2017, the disclosure of which is incorporated by reference in its entirety.

BACKGROUND

Auger type poultry chillers have been in use for more than 40 years. The equipment includes a nominally horizontal semi-cylindrical tank with an Archimedes screw running down the length of the tank. In this context, the screw is often called an auger.

A conventional auger type poultry chiller 10 is illustrated in FIGS. 1-3. A tank 12 is filled with chilled water, typically to a level at or slightly above the top of the auger shaft 22. The chilled water may be supplied from a heat exchanger 40. Freshly slaughtered and eviscerated birds are introduced into the tank 12 at an inlet end 14 and conveyed to the opposite outlet end 16 by turning the auger 20 (e.g., using a motor that is operatively coupled to the auger 20). The auger 20 is designed such that the water in the tank 12 is not conveyed along with the birds. Instead, water flows around the edges of the auger flight or through passages in the flight provided for this purpose to effectively move the water in a direction counter to the movement of the birds. With one exception described below, the gaps and passages through which water flows are too small for birds to pass through back toward the inlet end of the tank.

Auger chillers are often in excess of 60 feet in length. However, in order to facilitate fabrication and transport, designers generally avoid auger spans that exceed approximately 30 feet in length. Consequently, the screw must be supported at intermediate points along its length. This support has historically been provided by so-called hanger bearings (see, e.g., the hanger bearing 30 in FIGS. 2 and 3). The hanger bearing includes a bearing element—usually of the journal type—installed around a coupling shaft that joins two adjacent sections of the auger 24, 26 (FIG. 3). The bearing element is suspended from above by a hanger 34 that is fixed to a support member 32 at the top edge of the tank 12 (FIG. 3).

In the prior art, hangers have been fabricated from robust material shapes such as 4 inch square tubing. While providing relatively rigid support for the bearing and auger, such large structural members require a correspondingly large gap between one section of the auger and the next. It is not unusual for this gap to be 10 inches or larger in width. Such a gap is large enough for birds to pass through from one side of the auger flight to the next. Such "leakage" of birds can interrupt the sequence in which birds are processed and introduce variability in the time birds spend in the tank.

Another problem is that the large gap allows birds to remain in the chiller after processing is complete. These birds must be removed by handling personnel prior to cleaning the chiller tank. In addition to increased time and expense associated with the cleanup process, expense is incurred due to loss of product at the hanger bearing.

The need for better chiller performance at intermediate bearings is described in U.S. Pat. Nos. 6,722,490 and 6,951,273, the disclosures of which are incorporated herein in their entireties. Interruptions in the auger flight allow birds to move between compartments in the Archimedes screw. The '490 and '273 patents address a bearing design that would take up less space, but neglect to detail the application of this bearing and techniques to minimize the gap in the auger flight.

The present inventor considered one strategy in which the flight of the downstream auger section matches that of the upstream auger section as though a continuous flight had been made and then an interval was removed to allow the hanger support to pass through (FIG. 4A). However, due to the relatively short pitch (axial distance from one flight to the next) used in auger chillers, simply deleting a segment from a continuous flight along a short axial distance would result in a broad opening in the transverse direction (FIG. 4B). Such an opening can allow birds to pass through with relative ease.

The present inventor considered another approach in which the edges at the end of the upstream and downstream flights are aligned such that the distance between the two edges is minimized (FIGS. 5A and 5B). This creates a "step" for the product to overcome at the hanger. Rather than facing an inclined plane that encourages the bird to move primarily along the length of the tank, the step presents the product with a blunt face that encourages the bird to move circumferentially around the tank. As the gap in the flight approaches the hanger, it can even create a scissors action that tends to damage the product (FIGS. 5C and 5D). Potential damage from this pinching action is one reason wide gaps have been tolerated in prior art chillers even though processing consistency is compromised. A wide gap allows a bird to be pushed through rather than damaged.

The approaches described in reference to FIGS. 4A, 4B and 5A-D could be pursued, but are not necessarily approaches that have been previously conceived or pursued. Therefore, unless otherwise described herein, the approaches described in reference to FIGS. 4A, 4B and 5A-D are not prior art to claims in this application and any application claiming priority from this application, are not admitted to be prior art by inclusion in this section, and may be attributed to the present inventor's appreciation of the problem to be solved.

SUMMARY

Some embodiments of the invention are directed to a poultry chiller. The chiller includes an elongated tank and an auger rotatably held lengthwise in the tank and defining a longitudinal axis. The auger includes a first auger section including a first auger shaft and a first auger flight that extends radially away from the first auger shaft. The first auger flight includes a first helical portion that is helically disposed on the first auger shaft and a first flight extension that extends away from the first helical portion. The auger includes a second auger section including a second auger shaft and a second auger flight that extends radially away from the second auger shaft. The second auger flight includes a second helical portion that is helically disposed on the second auger shaft and a second flight extension that extends away from the second helical portion. The chiller includes a coupling shaft coupling a first coupling end of the first auger shaft and an adjacent second coupling end of the second auger shaft. The chiller includes a hanger bearing assembly including a bearing assembly supporting the coupling shaft, a support member coupled to an upper portion of the tank, and a hanger extending between the bearing assembly and the support member. The first auger flight overhangs the first coupling end of the first auger shaft and the second auger flight overhangs the second coupling end of the second auger shaft. A pitch or axial length between the first and second auger flights across the hanger bearing assembly is greater than a pitch of each of the first and second helical portions of the first and second auger flights.

In some embodiments, as the auger rotates in the tank, the hanger passes through an axial gap defined by the first and second flight extensions. The axial gap may have a greater axial length at the first and second auger shafts than at outer edges of the first and second flight extensions. The axial gap may include a first portion extending radially away from the first and second auger shafts and a second portion extending radially away from the first portion of the axial gap to the outer edges of the first and second flight extensions. The axial length of the first portion of the axial gap may decrease from the first and second auger shafts to the second portion of the axial gap.

In some embodiments, as the auger rotates in the tank, a leading edge of the second flight extension and an engagement edge of the hanger are configured to urge product caught therebetween radially outwardly toward an outer edge of the first auger flight and/or an outer edge of the second auger flight. The engagement edge of the hanger may be arcuate. The leading edge of the second flight extension may be substantially straight and may define an offset angle with a projection extending radially away from the longitudinal axis of the auger. The offset angle may be at least 20 degrees. A lower surface of the support member and the outer edge of the first auger flight and/or the outer edge of the second auger flight may define an opening that is sized to allow product urged radially outwardly to pass therethrough.

In some embodiments, the hanger does not extend past a side of the auger shaft on a pulling side of the chiller.

In some embodiments, a trailing edge of the first auger flight and a leading edge of the second auger flight define a circumferential gap therebetween. The circumferential gap may vary in width from the first and second auger shafts and outer edges of the first and second auger flights. The leading edge and the trailing edge may meet or overlap at one of the first and second auger shafts and the outer edges of the first and second flights. The leading edge and the trailing edge may be spaced apart at the other one of the first and second auger shafts and the outer edges of the first and second flights.

In some embodiments, the first and second flight extensions overlap when viewed along the auger longitudinal axis.

In some embodiments, an angle of engagement of at least 30 degrees is defined between a leading edge of the second flight extension and an engagement edge of the hanger.

In some embodiments, the hanger has an average width in a plane perpendicular to the auger longitudinal axis and a length in a direction parallel to the auger longitudinal axis. The hanger average width may be at least six times greater than the hanger length.

Some other embodiments of the invention are directed to a poultry chiller. The chiller includes an elongated tank and an auger rotatably held lengthwise in the tank and defining a longitudinal axis. The auger includes a first auger section including a first auger shaft and a first auger flight that extends radially away from the first auger shaft. The first auger flight includes a first helical portion that is helically disposed on the first auger shaft and a first flight extension that extends away from the first helical portion. The auger includes a second auger section including a second auger shaft and a second auger flight that extends radially away from the second auger shaft. The second auger flight includes a second helical portion that is helically disposed on the second auger shaft and a second flight extension that extends away from the second helical portion. The chiller includes a coupling shaft coupling a first coupling end of the first auger shaft and an adjacent second coupling end of the second auger shaft. The chiller includes a hanger bearing assembly comprising a bearing assembly supporting the coupling shaft, a support member coupled to an upper portion of the tank, and a hanger extending between the bearing assembly and the support member. The first auger flight overhangs the first coupling end of the first auger shaft and the second auger flight overhangs the second coupling end of the second auger shaft. As the auger rotates in the tank, the hanger passes through an axial gap defined by the first and second flight extensions. The axial gap has a greater axial length at the first and second auger shafts than at outer edges of the first and second flight extensions.

Some other embodiments of the invention are directed to a poultry chiller. The chiller includes an elongated tank and an auger rotatably held lengthwise in the tank and defining a longitudinal axis. The auger includes a first auger section including a first auger shaft and a first auger flight that extends radially away from the first auger shaft. The first auger flight includes a first helical portion that is helically disposed on the first auger shaft and a first flight extension that extends away from the first helical portion. The auger includes a second auger section including a second auger shaft and a second auger flight that extends radially away from the second auger shaft. The second auger flight includes a second helical portion that is helically disposed on the second auger shaft. The chiller includes a coupling shaft coupling a first coupling end of the first auger shaft and an adjacent second coupling end of the second auger shaft. The chiller includes a hanger bearing assembly including a bearing assembly supporting the coupling shaft, a support member coupled to an upper portion of the tank, and a hanger extending between the bearing assembly and the support member. The first auger flight overhangs the first coupling end of the first auger shaft. The hanger is positioned closer to the second coupling end of the second auger shaft than the first coupling end of the first auger shaft at the bearing assembly.

Some other embodiments of the invention are directed to a kit for a poultry chiller including an elongated tank and an auger rotatably held lengthwise in the tank and including a first auger section and a second auger section. The kit includes a first flight extension that is configured to connect to a first helical portion of a first auger flight that is helically disposed on a first auger shaft of the first auger section. The kit includes a coupling shaft assembly comprising a first coupling flange configured to couple to a first end plate of the first auger shaft and a second coupling flange configured to couple to an adjacent second end plate of the second auger shaft. The first and second coupling flanges are configured to allow adjustment of a rotational alignment between the first and second auger sections.

In some embodiments, the first coupling flange includes a plurality of elongated slots defined therein and arranged in a circular pattern, with the plurality of elongated slots being configured to be aligned with a plurality of receiving holes defined in the first end plate of the first auger shaft. The second coupling flange includes a plurality of elongated slots defined therein and arranged in a circular pattern, with the plurality of slots configured to be aligned with a plurality of receiving holes defined in the second end plate of the second auger shaft. The plurality of elongated slots of the first coupling flange and the plurality of elongated slots of the second coupling flange may be circumferentially offset from one another.

In some embodiments, when the first flight extension is connected to the first helical portion of the first auger flight, the first flight extension overhangs the first end plate of the first auger shaft.

In some embodiments, the kit includes a second flight extension that is configured to connect to a second helical portion of a second auger flight that is helically disposed on a second auger shaft of the second auger section.

In some embodiments, the kit includes a hanger bearing assembly including a bearing assembly configured to support the coupling shaft assembly and a hanger configured to extend between the bearing assembly and a support member coupled to an upper portion of the tank.

Some other embodiments of the invention are directed to a poultry chiller. The chiller includes an elongated tank and an auger rotatably held lengthwise in the tank and defining a longitudinal axis. The auger includes a first auger section including a first auger shaft and a first auger flight that extends radially away from the first auger shaft. The first auger flight includes a first helical portion that is helically disposed on the first auger shaft and a first flight extension that extends approximately circumferentially away from the first helical portion. The auger includes a second auger section including a second auger shaft and a second auger flight that extends radially away from the second auger shaft. The second auger flight includes a second helical portion that is helically disposed on the second auger shaft and a second flight extension that extends approximately circumferentially away from the second helical portion. The chiller includes a coupling shaft coupling a first coupling end of the first auger shaft and an adjacent second coupling end of the second auger shaft. The chiller includes a hanger bearing assembly including a bearing assembly supporting the coupling shaft, a support member coupled to an upper portion of the tank, and a hanger extending between the bearing assembly and the support member. The first auger flight overhangs the first coupling end of the first auger shaft and the second auger flight overhangs the second coupling end of the second auger shaft. The first flight extension is spaced apart from the first auger shaft and the second flight extension is spaced apart from the second auger shaft.

In some embodiments: first flight extension extends radially between an outer edge of the first helical portion and a first point at an inner portion of the first helical portion that is closer to the first auger shaft than the outer edge of the first helical portion; and/or the second flight extension extends radially between an outer edge of the second helical portion and a second point at an inner portion of the second helical portion that is closer to the second auger shaft than the outer edge of the second helical portion. As the auger rotates in the tank, the hanger may pass through a gap defined by the first and second flights. A circumferential dimension of the gap may have a maximum length or width between the first and second points. The circumferential dimension of the gap may increase between the first and second auger shafts and the first and second points. The circumferential dimension of the gap may decrease from the first and second points toward outer edges of the first and second flight extensions. The first and second flight extensions may overlap at outer edges thereof when viewed in an axial direction.

In some embodiments, a pitch or axial length between the first and second auger flights across the hanger bearing assembly is greater than a pitch of each of the first and second helical portions of the first and second auger flights.

In some embodiments, as the auger rotates in the tank, the hanger passes through a gap defined by the first and second flights. An axial dimension of the gap may have a greater length at the first and second auger shafts than at outer edges of the first and second flights.

In some embodiments, as the auger rotates in the tank, a leading edge of the second flight and an engagement edge of the hanger are configured to urge product caught therebetween radially outwardly toward an outer edge of the first auger flight and/or an outer edge of the second auger flight. The engagement edge of the hanger may be arcuate. A portion of the leading edge of the second flight may be substantially straight and may define an offset angle with a projection extending radially away from the longitudinal axis of the auger. The offset angle may be at least 20 degrees. A lower surface of the support member and the outer edge of the first auger flight and/or the outer edge of the second auger flight may define an opening that is sized to allow product urged radially outwardly to pass therethrough.

In some embodiments, an angle of engagement of at least 30 degrees is defined between a leading edge of the second flight and an engagement edge of the hanger.

Some other embodiments of the invention are directed to a kit for a poultry chiller including an elongated tank and an auger rotatably held lengthwise in the tank and including a first auger section including a first helical portion of a first auger flight that is helically disposed on a first auger shaft, and a second auger section including a second helical portion of a second auger flight that is helically disposed on a second auger shaft. The kit includes a first flight extension that is configured to connect to the first helical portion of the first auger flight, a second flight extension that is configured to connect to the second helical portion of the second auger flight, and a coupling shaft assembly including a first coupling flange configured to couple to a first end plate of the first auger shaft and a second coupling flange configured to couple to an adjacent second end plate of the second auger shaft. When the first flight extension is connected to the first helical portion of the first auger flight so as to extend approximately circumferentially away from the first helical portion, the first flight extension overhangs the first end plate of the first auger shaft and the first flight extension is spaced part from the first auger shaft. When the second flight extension is connected to the second helical portion of the second auger flight so as to extend approximately circumferentially away from the second helical portion, the second flight extension overhangs the second end plate of the second auger shaft and the second flight extension is spaced part from the second auger shaft.

In some embodiments, the coupling shaft assembly is configured to allow adjustment of a rotational alignment between the first and second auger sections such that a pitch between the first helical portion of the first auger flight and the second helical portion of the second auger flight is greater than the nominal pitch of the first and second helical portions of the first and second auger flights.

In some embodiments: the first coupling flange includes a plurality of elongated slots defined therein and arranged in a circular pattern, with the plurality of elongated slots configured to be aligned with a plurality of receiving holes defined in the first end plate of the first auger shaft; and/or the second coupling flange includes a plurality of elongated slots defined therein and arranged in a circular pattern, with the plurality of slots configured to be aligned with a plurality of receiving holes defined in the second end plate of the second auger shaft.

In some embodiments, the kit includes a hanger bearing assembly including a bearing assembly configured to support the coupling shaft assembly and a hanger configured to extend between the bearing assembly and a support member coupled to an upper portion of the tank.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 7 is a partial cutaway fragmentary side view of first and second auger sections and a hanger bearing assembly of the chiller of FIG. 6 according to some embodiments.

FIG. 8 is a partial cutaway fragmentary side view illustrating details of the hanger bearing assembly of FIG. 7 according to some embodiments.

FIG. 9 is a fragmentary top sectional view illustrating the first and second auger sections and a hanger of the hanger bearing assembly of FIG. 7 according to some embodiments.

FIGS. 14A-14C illustrate a leading edge of a flight of the second auger section approaching an engagement edge of a hanger of the hanger bearing assembly.

FIGS. 20 and 21 are end sectional views directed toward the inlet of a chiller including the first and second auger sections and the hanger bearing assembly of FIG. 16 with the first and second auger sections being rotated; FIGS. 20 and 21 illustrate a leading edge of a flight of the second auger section approaching an engagement edge of a hanger of the hanger bearing assembly.

FIG. 22 is an end sectional view directed toward the outlet of a chiller including the first and second auger sections and the hanger bearing assembly of FIG. 16.

FIG. 23 is a fragmentary side view of first and second auger sections and a hanger bearing assembly with the pitch across the hanger bearing assembly equal to the pitch of the upstream and downstream auger flights.

DETAILED DESCRIPTION

Figure 1:
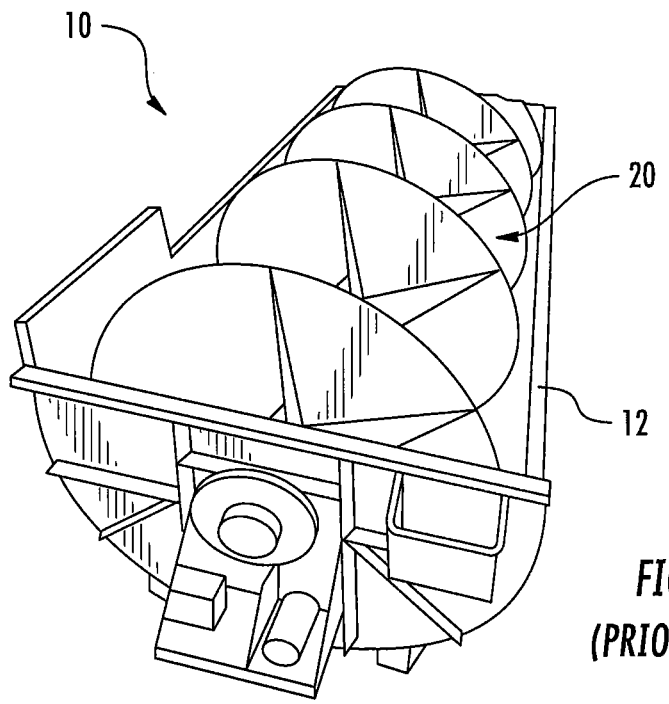
FIG. 1 is a fragmentary perspective view of an auger type poultry chiller.
Figure 2:
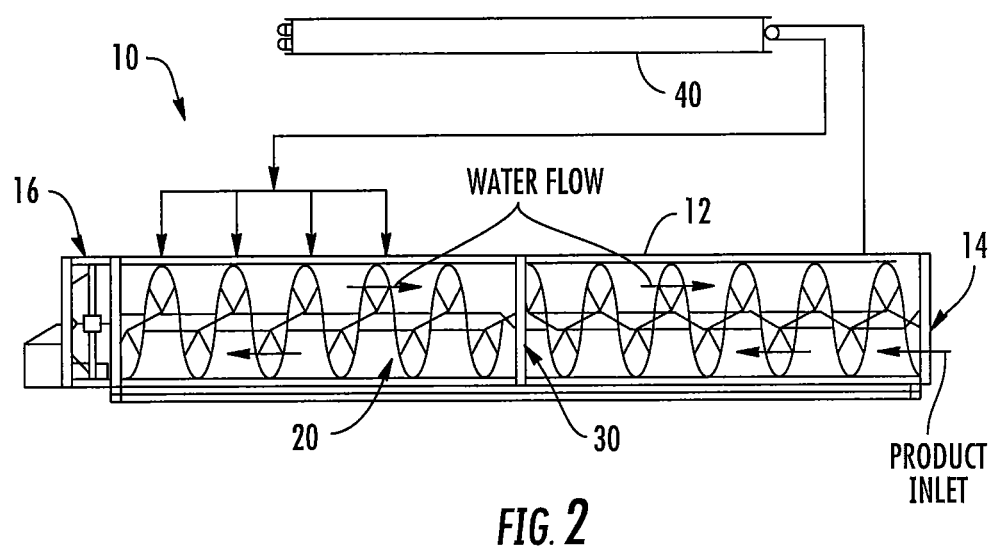
FIG. 2 is a side sectional view of the chiller of FIG. 1.
Figure 3:
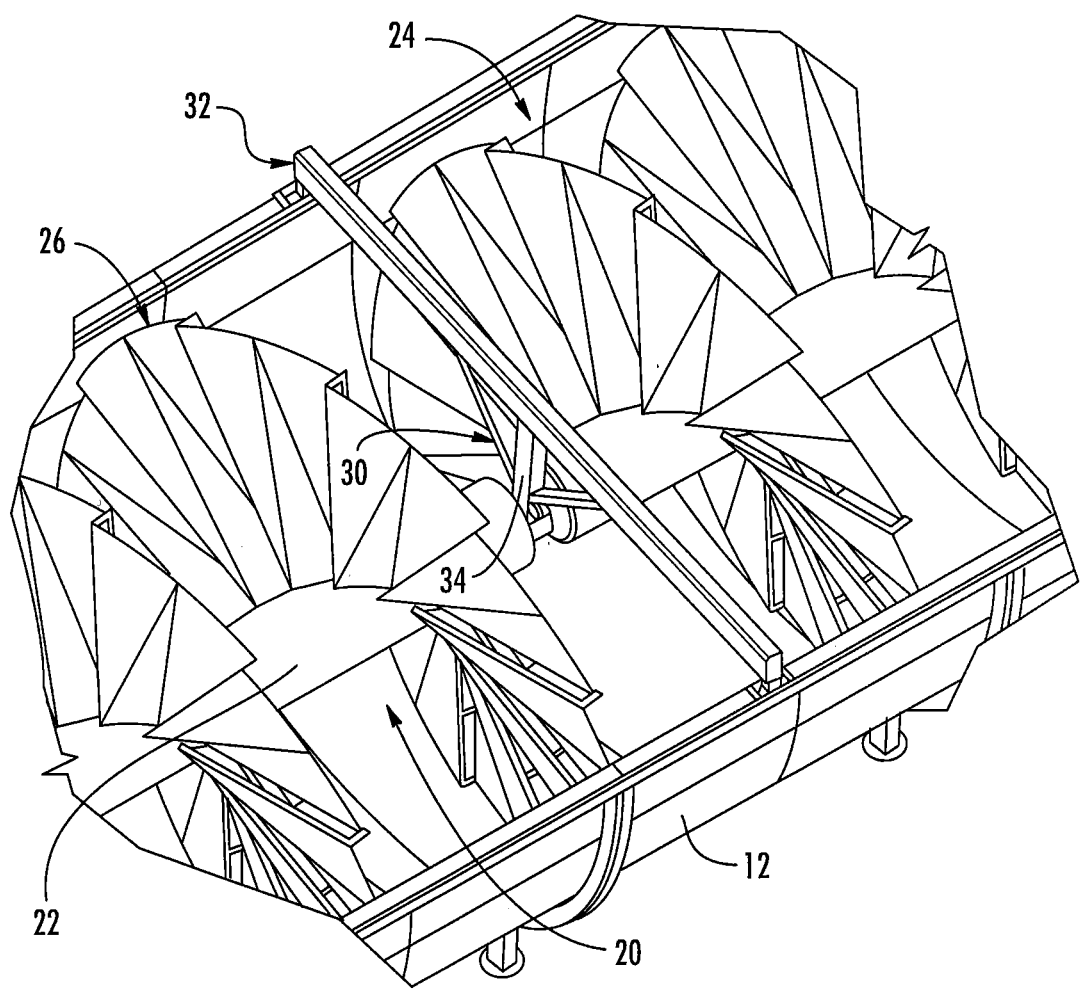
FIG. 3 is another fragmentary perspective view of the chiller of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "monolithic" means an object that is a single, unitary piece formed or composed of a material without joints or seams.

As used herein, the term "angle of engagement" means the angle formed between the leading edge of a downstream auger flight and the engagement edge (or first edge encountered) of the hanger. When the edges are non-linear, the angle is measured between the tangents to the curves at the point the edges intersect as viewed from the end of the auger.

As used herein, the term "auger section" means a segment of an Archimedes screw including a central shaft and one or more revolutions of flight and configured to be supported at either end in a manner that permits rotation about the center of the shaft.

As used herein, the term "flight" means the blade of the auger extending from the central shaft outward toward the tank wall in an approximately helical form. The flight engages the product and pushes the product along the length of the chiller as the auger turns. The flight may be pierced or discontinuous to facilitate water flow through the chiller and may have breaks or buttresses that deviate from pure helical form to provide structural stiffness.

As used herein, the term flight "pitch" means the axial distance advanced as the helical flight makes one complete revolution of the axis. As described in more detail herein, the pitch may be locally altered.

As used herein, the term "hanger" means a structural member that supports a bearing in which the auger assembly (one or more auger sections joined by coupling shafts) rotates. The hanger usually suspends the bearing from a structural beam situated across the top of the chiller tank. It should provide accurate and rigid positioning in the vertical and transverse directions, but need not be particularly rigid in the axial direction.

As used herein, the term "leading edge" means the radial edge of an auger flight at the upstream end of an auger section.

As used herein, the term "outer edge" means the edge of an auger flight farthest from the axis of rotation and closest to the tank wall.

As used herein, the term "trailing edge" means the radial edge of an auger flight at the downstream end of an auger section.

As used herein, the term "engagement edge" means the edge of a hanger which first passes by the leading edge of an auger as the auger rotates.

As used herein, the term "engagement angle" means the angle between a tangent to the engagement edge of a hanger and a tangent to an adjacent leading edge of a flight or flight extension measured at the point at which the two edges intersect when viewed along the axis of auger rotation.

As used herein, the term "flight extension" means a feature similar in structure to a flight and extending as a continuation of a flight but extending in a direction or configuration that may deviate from a helical form. A flight extension may extend approximately circumferentially from a flight.

As used herein, the term "overhang" or "overhung" means that some portion of a feature such as an auger flight extends in an axial direction past the end of an auger shaft.

In some embodiments, the term "substantially" when used in connection with a claimed angular relationship includes angles that are ±5° of the claimed angular relationship. In some other embodiments, the term "substantially" when used in connection with a claimed angular relationship includes angles that are ±3° of the claimed angular relationship. For example, a plane that is substantially perpendicular to an axis may form an angle with the axis that is between 85 and 95° or between 87 and 93° in various embodiments.

Streamwise directions including "upstream" and "downstream" refer to the relative position of components with respect to the nominal direction in which the product progresses as it is processed in the chiller.

Figure 6:
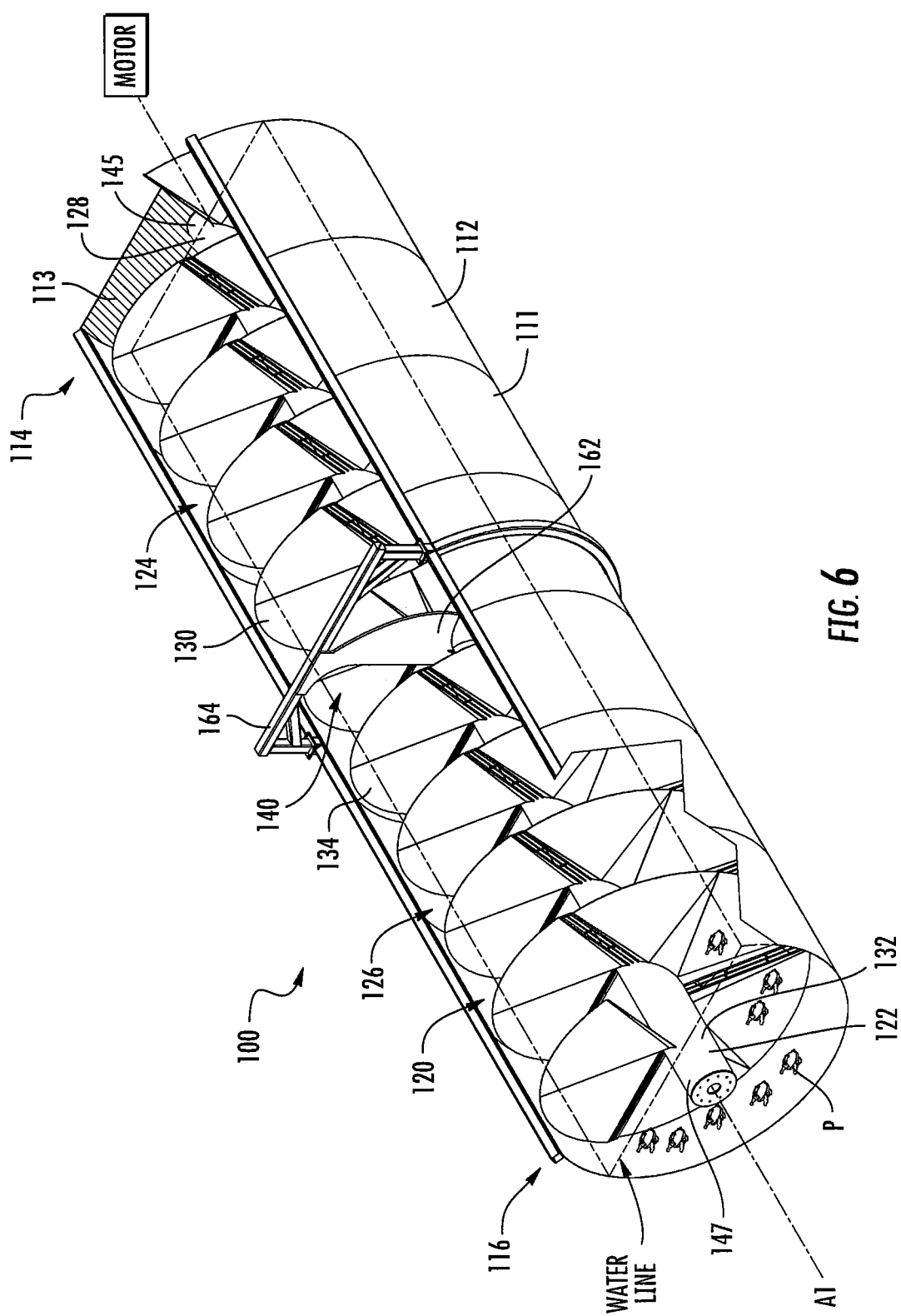
FIG. 6 is a partial cutaway perspective view of an auger chiller according to some embodiments.

An auger chiller 100 according to some embodiments is illustrated in FIG. 6. The chiller 100 includes a tank 112 and an auger 120 held in the tank. The tank includes a semi-cylindrical shell 111 and opposing end walls 113 (only one end wall 113 is illustrated in FIG. 6 to more clearly show features of the chiller 100).

The auger 120 extends from a product inlet end 114 of the tank 112 to a product outlet end 116 of the tank 112. The auger 120 includes an auger shaft 122. As understood by those skilled in the art, the auger 120 is rotatable in the tank 112 about a longitudinal or rotational axis A1 defined by the auger shaft 122 (e.g., by a motor that is operatively coupled to the auger shaft 122). The auger 120 may or may not be coaxial with the tank 112.

The auger 120 includes a first or upstream auger section 124 and a second or downstream auger section 126.

The first auger section 124 includes a first auger shaft 128 and a flight 130 helically disposed on the shaft 128. Similarly, the second auger section 126 includes a second auger shaft 132 and a flight 134 helically disposed on the shaft 132. The auger shaft 122 includes the first and second auger shafts 128, 132.

Referring to FIGS. 6 and 7, a hanger bearing or hanger bearing assembly 140 is disposed between the adjacent first and second auger sections 124, 126. The assembly 140 includes a bearing assembly 142. The bearing assembly 142 will be described in more detail below.

Figure 15B:
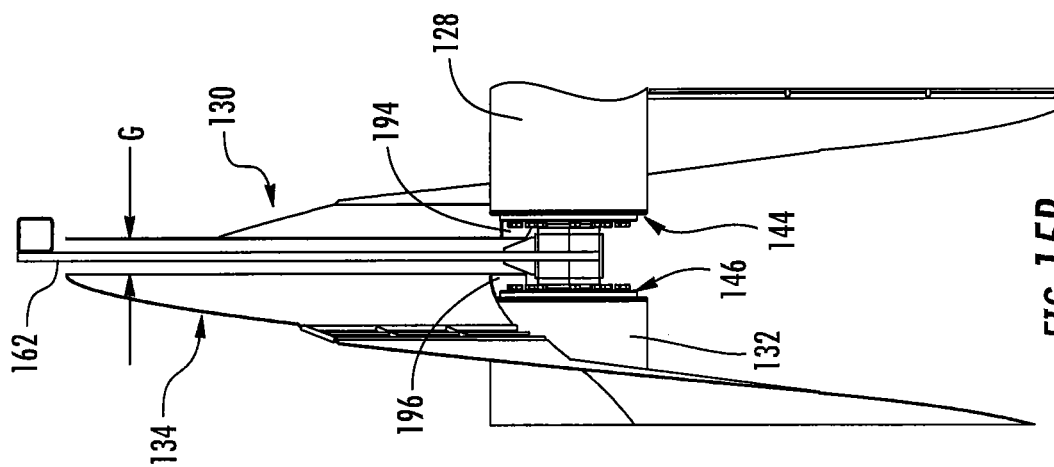
FIGS. 15A and 15B are fragmentary side views of the first and second auger sections and the hanger bearing assembly of FIG. 11.

Referring to FIG. 8, the first auger shaft 128 includes a first coupling end 144 and the second auger shaft 132 includes a second coupling end 146. A first auger shaft end plate 148 is at the first coupling end 144 and a second auger shaft end plate 150 is at the second coupling end 146. A coupling shaft 152 extends past the first end plate 148 and into the first auger shaft 128 and also extends past the second end plate 150 and into the second auger shaft 132. An alternate configuration for the coupling shaft is illustrated in FIG. 15B in which flange plates are joined to either end of the coupling shaft, and the flange plates are coupled to the first and second shaft end plates 148 and 150. The coupling shaft 152 thereby joins the first and second auger shafts 128, 132 in a manner that maintains rotational alignment and tortional rigidity of the two shafts.

Referring to FIG. 6, the first auger shaft 128 may include a first support end 145 that is opposite the first coupling end 144. The first support end 145 may couple to the tank 112 at or adjacent one of the end walls 113. Similarly, the second auger shaft 132 may include a second support end 147 that is opposite the second coupling end 146. The second support end 147 may couple to the tank 112 at or adjacent the other one of the end walls 113.

Referring to FIG. 8, the bearing assembly 142 includes a bearing 154 that supports (e.g., surrounds or at least partially surrounds) the coupling shaft 152. The bearing 154 may be, for example, a journal bearing. The bearing 154 is held in a bearing housing 156. In some embodiments, the bearing housing 156 includes an upper bearing housing 158 and a lower bearing housing 160.

Figure 17:
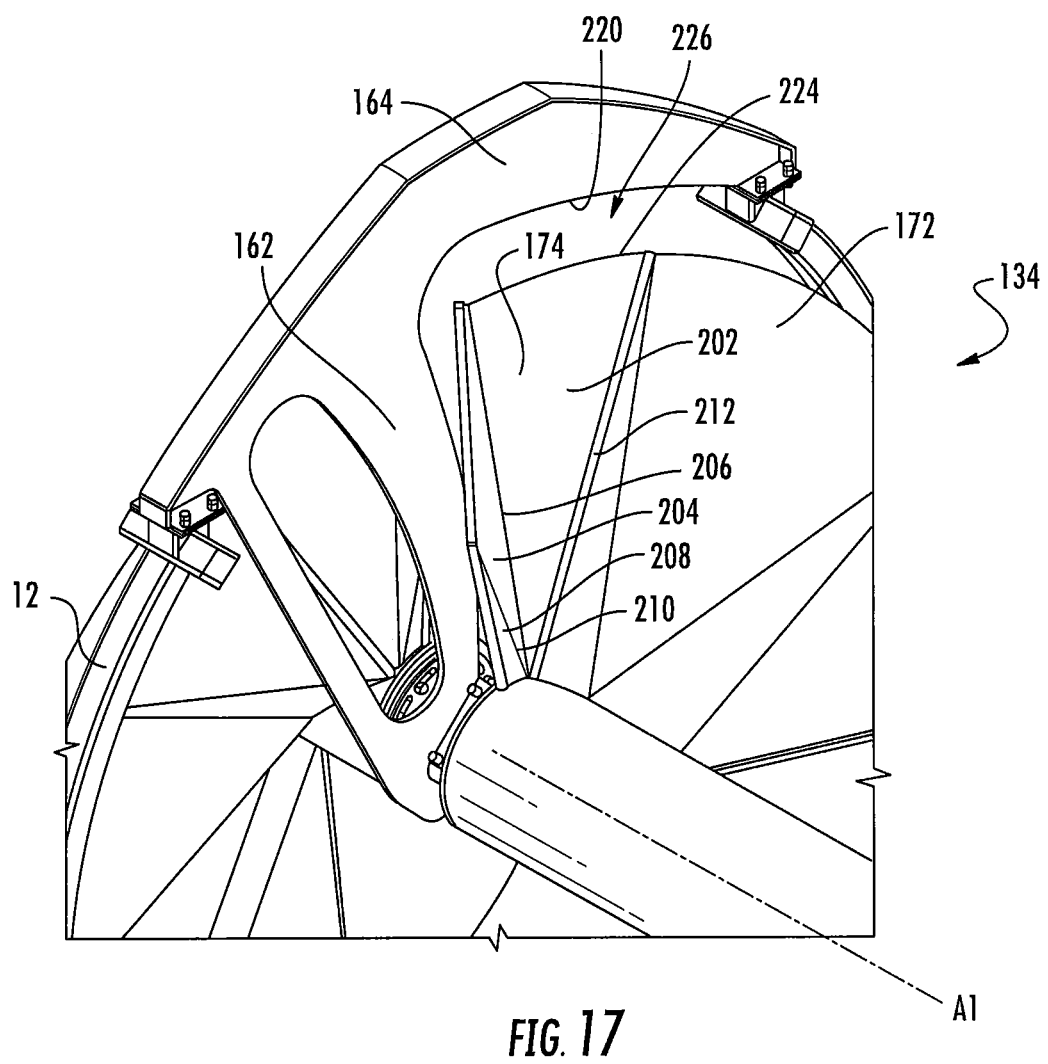
FIG. 17 is a fragmentary perspective view of the first auger section and the hanger bearing assembly of FIG. 16.
Figure 18:
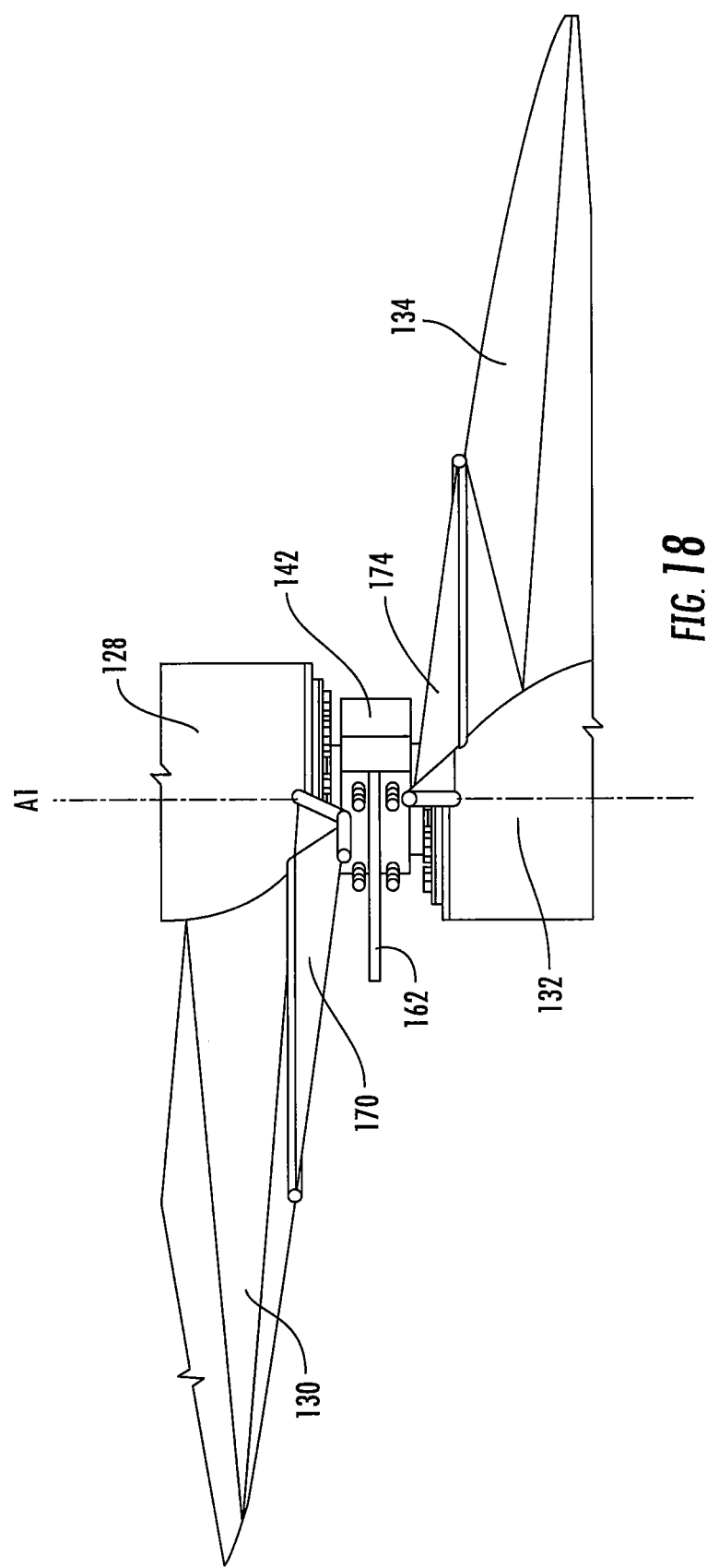
FIG. 18 is a fragmentary top view of the first and second auger sections and hanger bearing assembly of FIG. 16.

The hanger bearing 140 includes a hanger 162 that is coupled to the bearing housing 156. Referring to FIGS. 6 and 7, the hanger 162 is coupled to a support member 164 which may be a horizontal bar coupled to the top of the auger tank 112 as shown. The hanger 162 thereby supports the bearing assembly 142 and/or the coupling shaft 152 such that the auger shaft 122 is held in a horizontal orientation. It will be appreciated that, in some embodiments, the hanger 162 and the support member 164 may be integrally formed (see, e.g., FIG. 17).

In some embodiments, the hanger 162 when viewed in cross section (FIG. 9) is rectangular and has a width W1 perpendicular to the auger longitudinal axis A1 and a length or thickness L1 parallel to the auger longitudinal axis A1 (FIG. 7). The hanger 162 may have a relatively small length L1 to help reduce a width of a gap G between the flight 130 of the first auger section 124 and the flight 134 of the second auger section 126. The hanger 162 may have a length L1 of less than 2 inches and, in some embodiments, may have a length L1 of 1 inch or less. Because the hanger 162 must help support the heavy first and second auger sections 124, 126, the hanger 162 may have a relatively large width W1. The hanger 162 may have a width W1 of at least 4 inches and, in some embodiments, may have a width W1 of at least 10 inches. The size, shape and material chosen for the hanger will provide sufficient strength and rigidity to resist vertical and lateral loads on the bearing, but axial loads should be minimal.

In various embodiments, the hanger 162 may have an average hanger width perpendicular to the auger longitudinal axis A1 that is at least six times greater, at least eight times greater or about 12 times greater than the hanger axial length parallel to the auger longitudinal axis A1.

Figure 4A:
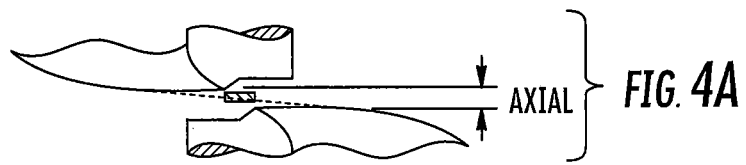
FIG. 4A is a schematic top sectional view of first and second auger sections and a hanger therebetween.
Figure 4B:
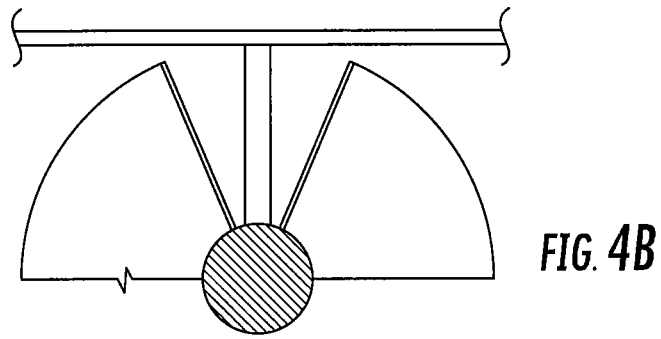
FIG. 4B is a schematic side sectional view of the first and second auger sections and the hanger of FIG. 4A.
Figure 5A:
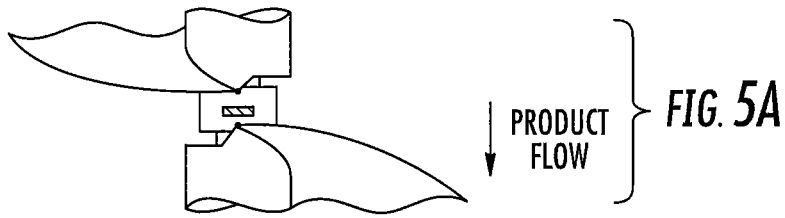
FIG. 5A is a schematic top sectional view of first and second auger sections and a hanger therebetween.
Figure 5B:
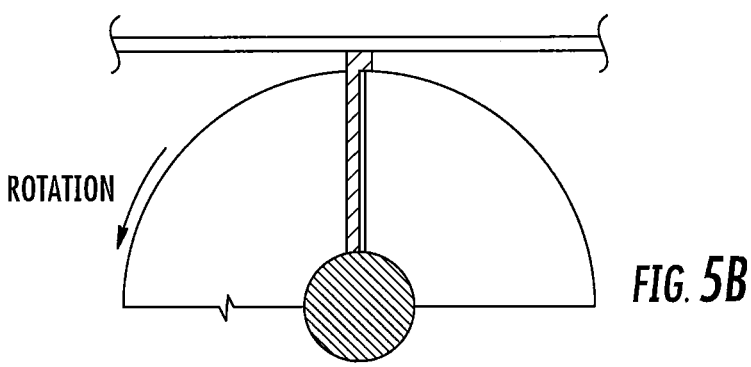
FIG. 5B is a schematic side sectional view of the first and second auger sections and the hanger of FIG. 5A.
Figure 5C:
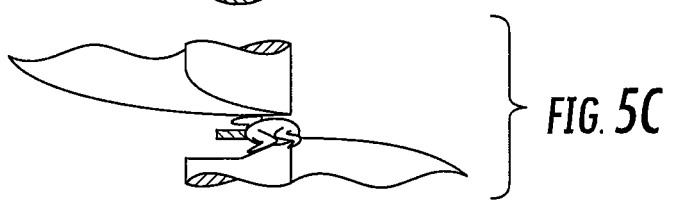
FIGS. 5C and 5D are schematic top and side sectional views, respectively, illustrating product being pinched between the hanger and a leading edge of the second auger section.
Figure 5D:
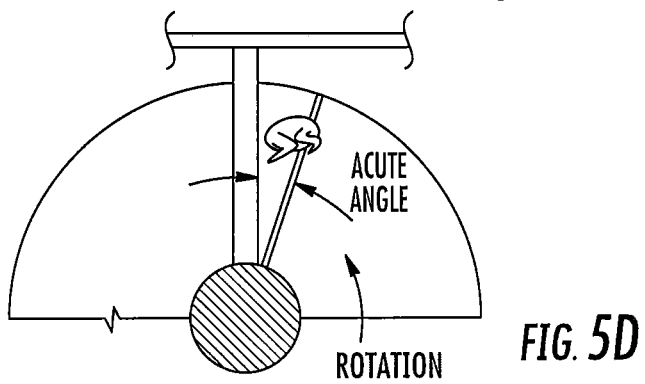

In some embodiments, the hanger 162 when viewed from an end of the tank may have a rectangular profile as illustrated in FIG. 4B (hanger not labeled). In some other embodiments, the hanger 162 may have a shape other than a rectangle. For example, and as illustrated in FIG. 6, the hanger 162 may include one or more arcuate or curved edges. This may be particularly advantageous when used in conjunction with flight members according to some embodiments, as described in more detail below.

As illustrated in FIGS. 7-9, in accordance with some embodiments, the first and second flights 130, 134 overhang the first and second auger shafts 128, 132, respectively, to further narrow the gap G between the auger flights 130, 134. In this regard, the axial spacing (gap) is not constrained by the axial length of the bearing assembly 142 between the auger sections 124, 126.

Figure 10:
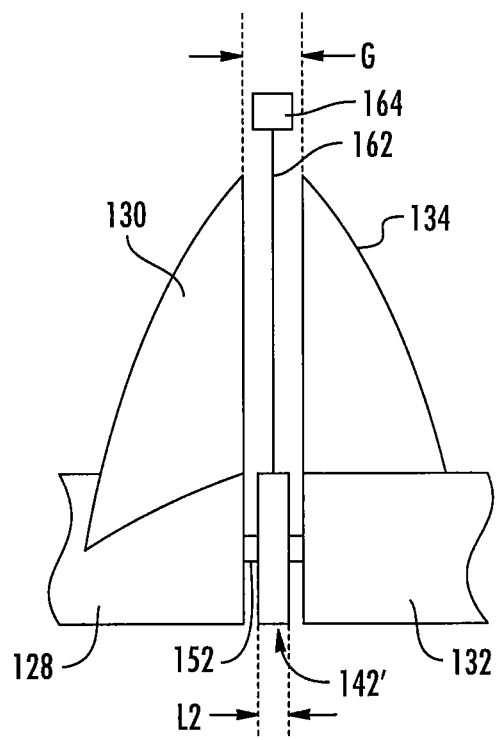
FIG. 10 is a fragmentary side view of first and second auger sections and a hanger bearing assembly of the chiller of FIG. 6 according to some embodiments.

In some embodiments, and as illustrated in FIG. 10, the bearing assembly 142' may include a "narrow" bearing and bearing housing having short axial extent relative to conventional bearing assemblies used with auger chillers. This also helps reduce the axial spacing or gap G between the auger flights 130, 134. The auger flights 130, 134 may overhang the auger shafts 128, 132 as described above in reference to FIGS. 7-9. Alternatively, in the embodiment illustrated in FIG. 10, the auger flights 130, 134 do not overhang the auger shafts 128, 132.

The bearing assembly 142' may have an axial length L2 that is less than 6 inches and, in some embodiments, is less than 3 inches.

Figure 11:
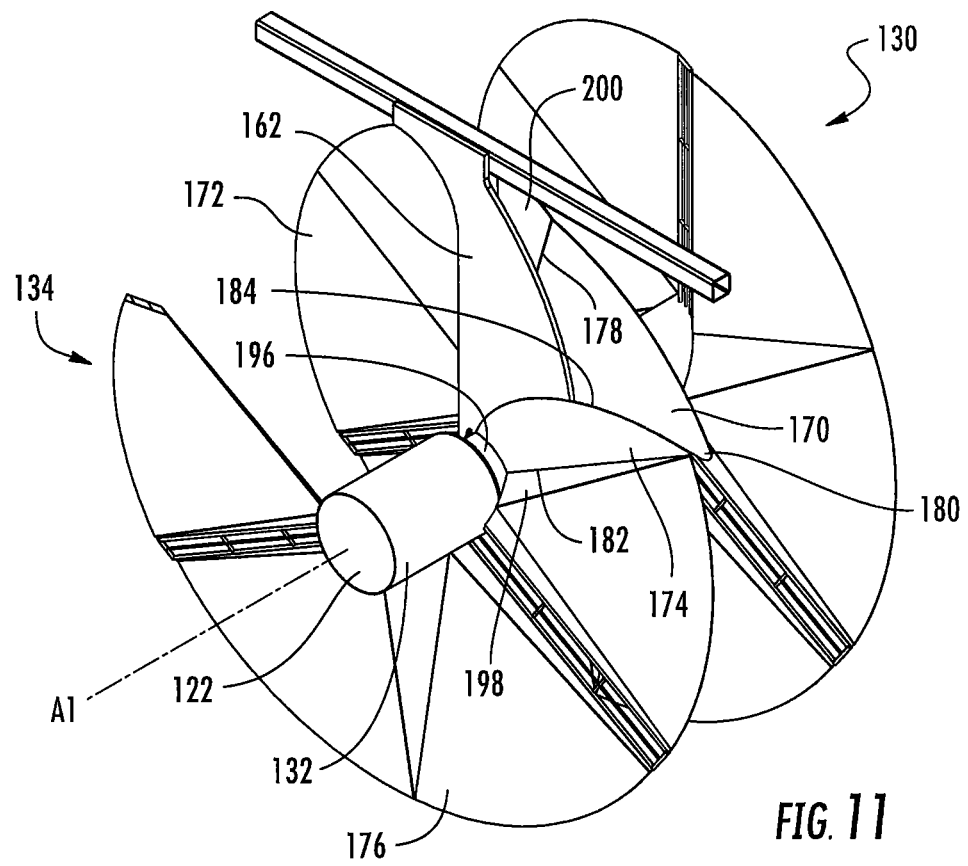
FIG. 11 is a fragmentary perspective view of first and second auger sections and a hanger bearing assembly of the chiller of FIG. 6 according to some embodiments.

Referring to FIG. 11, the auger flights 130, 134 may include flight extensions to bridge the circumferential gap between adjacent auger sections illustrated in FIG. 4B. A first flight extension 170 extends from a helical portion 172 of the first auger flight 130 and a second flight extension 174 extends from a helical portion 176 of the second auger flight 134.

The first and second flight extensions 170, 174 extend in a direction or plane perpendicular or substantially perpendicular to the longitudinal axis A1 of the auger shaft 122. The first and second flight extensions 170, 174 are on opposite sides of the hanger 162 and are parallel to the hanger 162. This configuration provides parallel faces (i.e., the flight extensions 170, 174) between which the hanger 162 passes as the auger rotates.

Figure 12:
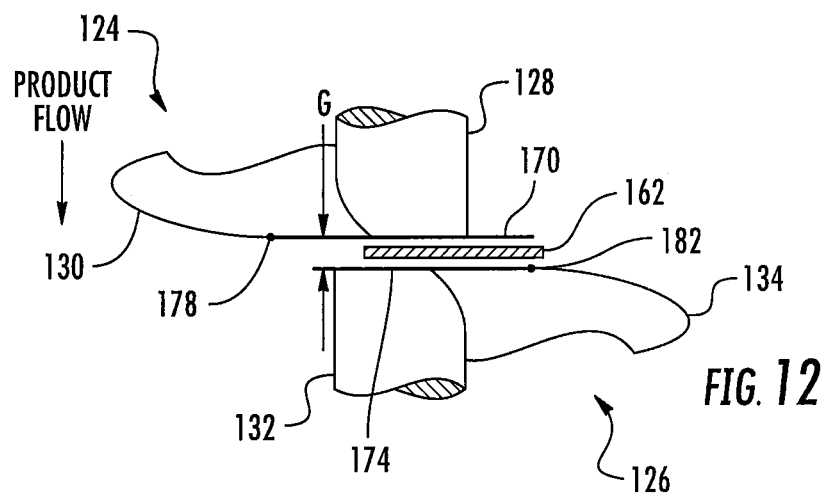
FIG. 12 is a fragmentary top sectional view illustrating first and second auger sections and a hanger of the chiller of FIG. 6 according to some embodiments.

Referring to FIGS. 11 and 12, the first flight 130 bends back at a break line 178 so that the first flight extension 170 and a trailing edge 180 thereof is parallel or substantially parallel to the hanger 162. Similarly, the second flight 134 bends back at a break line 182 so that the second flight extension 174 and a leading edge 184 thereof is parallel or substantially parallel to the hanger 162.

As noted above in reference to FIGS. 4A and 4B, one strategy for aligning the upstream auger section with an adjacent downstream auger section is to rotate the sections relative to one another until the fighting from the downstream section is coincident with a projection of a fighting from the upstream section. However, as described above, this leaves a relatively large circumferential gap between flight edges on either side of the bearing.

Embodiments of the invention close or reduce this gap by extending the trailing edge 180 of the upstream flight 130 not in a helical direction but rather in a plane that is perpendicular to the longitudinal or rotational axis A1 of the auger. In addition, the leading edge 184 of the downstream flight 134 extends not in a helical direction but rather in a plane that is also perpendicular to the longitudinal or rotational axis A1 of the auger.

Figure 13:
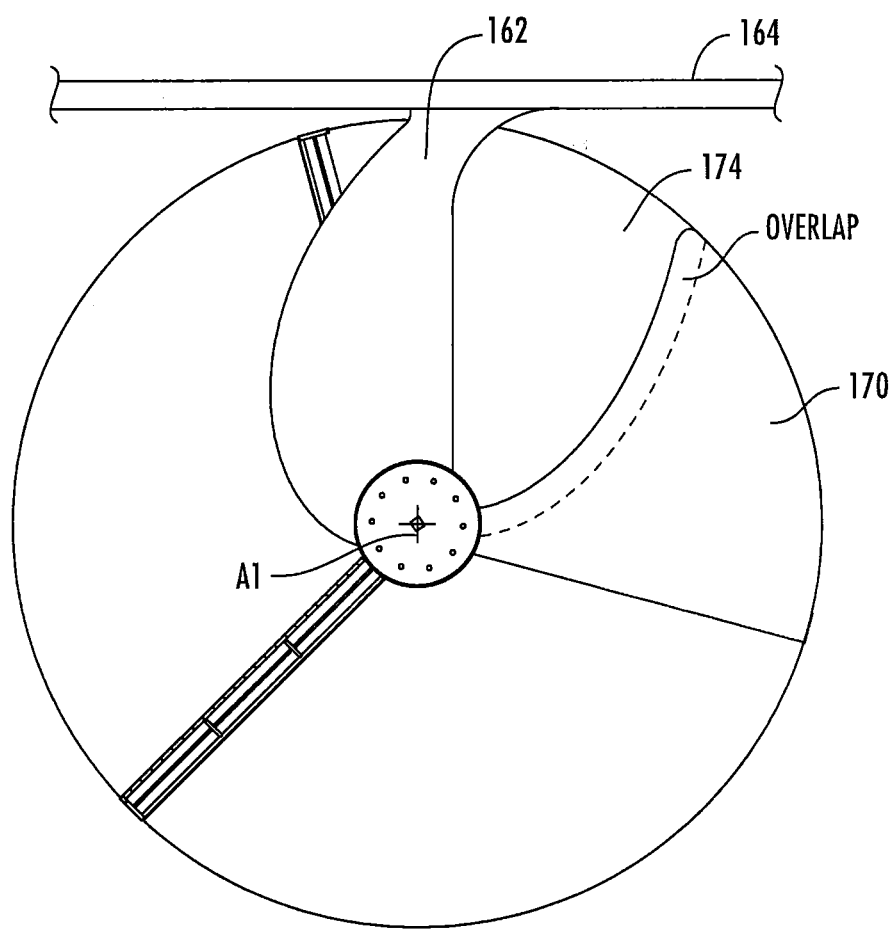
FIG. 13 is a fragmentary end sectional view of the first and second auger sections and the hanger bearing assembly of FIG. 11.

Referring to FIGS. 12 and 13, the first and second flight extensions 170, 174 at least partially overlap when viewed in the axial direction (i.e., in a direction along or parallel to the longitudinal or rotational axis A1 of the auger). It may be desirable to limit the extent of overlap in order to facilitate cleaning. The first and second flight extensions 170, 174 form parallel faces offset by a gap G (FIG. 10). This gap is too narrow for a bird to pass through. The gap G may be less than 6 inches and, in some embodiments, is less than 3 inches.

As noted above in reference to FIGS. 5A-5D, a gap in the flight at the hanger creates a pinch point where the hanger passes through the gap at an acute angle. The angle at which the engagement edge of the hanger approaches the leading edge of the flight creates a scissor-like effect that can damage product.

Figure 14C:
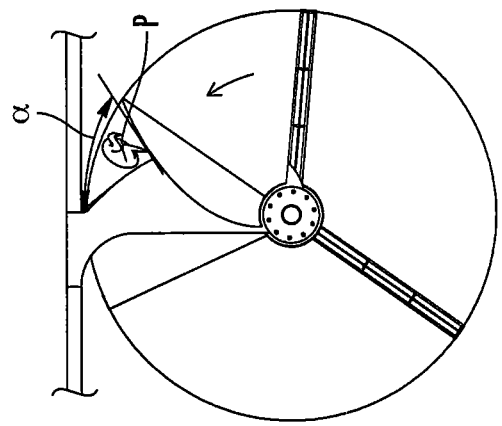
FIGS. 14A-14C are fragmentary end sectional views of the first and second auger sections and the hanger bearing assembly of FIG. 11 with the first and second auger sections being rotated.
Figure 14B:
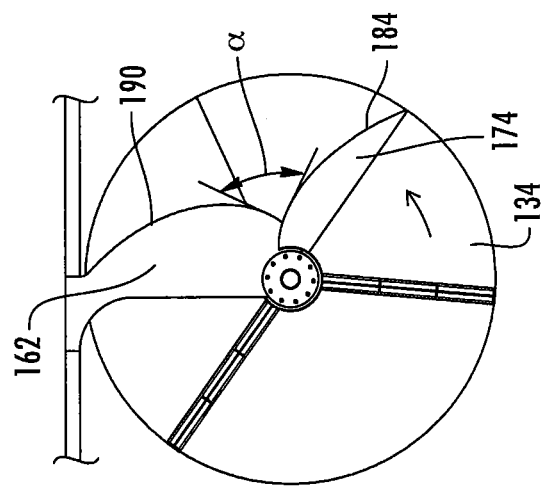
Figure 14A:
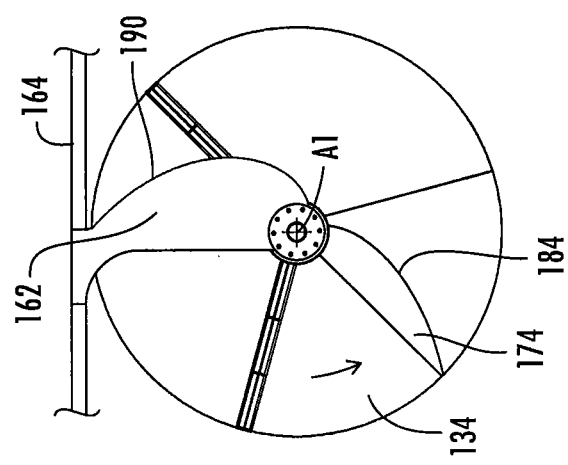

Embodiments of the invention increase or open the angle of engagement between the hanger and the leading edge of the flight. As illustrated in FIG. 14A, an engagement edge 190 of the hanger 162 is curved rather than linear. Referring to FIGS. 14A-14C, the hanger engagement edge 190 may curve away from the approaching leading edge 184 of the flight 134 as the radial distance from the rotational axis A1 increases. The profile of the hanger engagement edge 190 may be a spiral about the rotational axis A1 that maintains a constant or substantially constant angle of engagement α with the leading edge 184 of the flight 134 (or the leading edge 184 of the flight extension 174). The leading edge 184 of the flight 134 or the flight extension 174 may have the profile of an opposite hand spiral about the rotational axis A1. The profile of leading edge 184 may be symmetrical to the profile of engagement edge 190 or it may have greater or less apparent curvature.

When the angle of engagement is relatively large, product caught between the leading edge 184 of the flight 134 and the hanger 162 will be pushed toward the outer edge of the flight rather than being crushed between the edges of the flight and the hanger (see FIG. 14C). In some preferred embodiments, the angle of engagement α is at least 30°. In some embodiments, the angle of engagement α is an obtuse angle, although any extent to which the angle can be increased may be beneficial.

Figure 25:
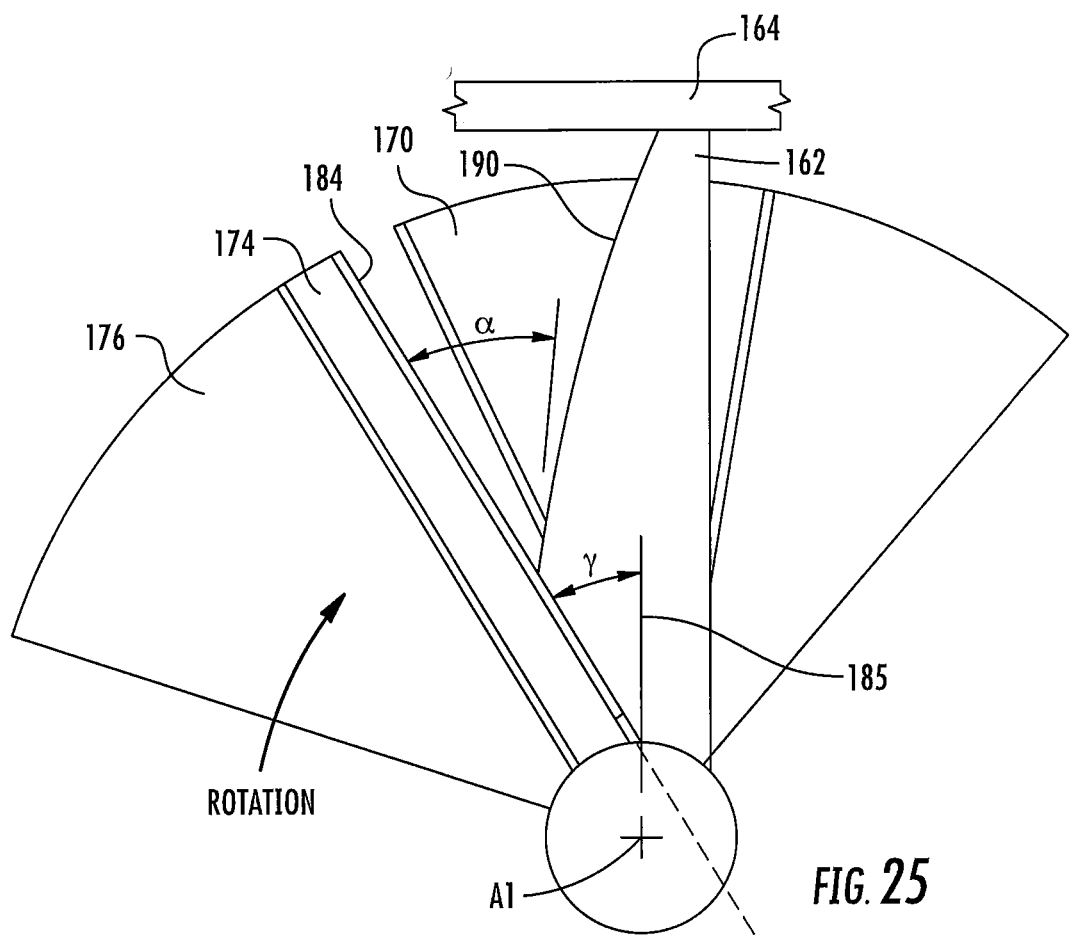
FIG. 25 is an end sectional view illustrating an alternative arrangement from that of FIG. 19 with the leading edge of the second auger flight or a projection thereof offset from the longitudinal axis of the auger shaft.

In other embodiments, the leading edge 184 may be straight or approximately straight while still forming a relatively open angle with the engagement edge 190. As illustrated in FIG. 25, such a straight leading edge 184 may be disposed at an offset angle γ relative to a radial projection 185 from the axis A1 of the shaft in order to further enlarge the angle of engagement. In various embodiments, the angle γ may be at least 20°, at least 25°, and at least 30°. Stated differently, a projection of the leading edge 184 (shown in dashed line) may not extend through the shaft axis A1 but rather may be offset from the shaft axis A1.

Figure 15A:
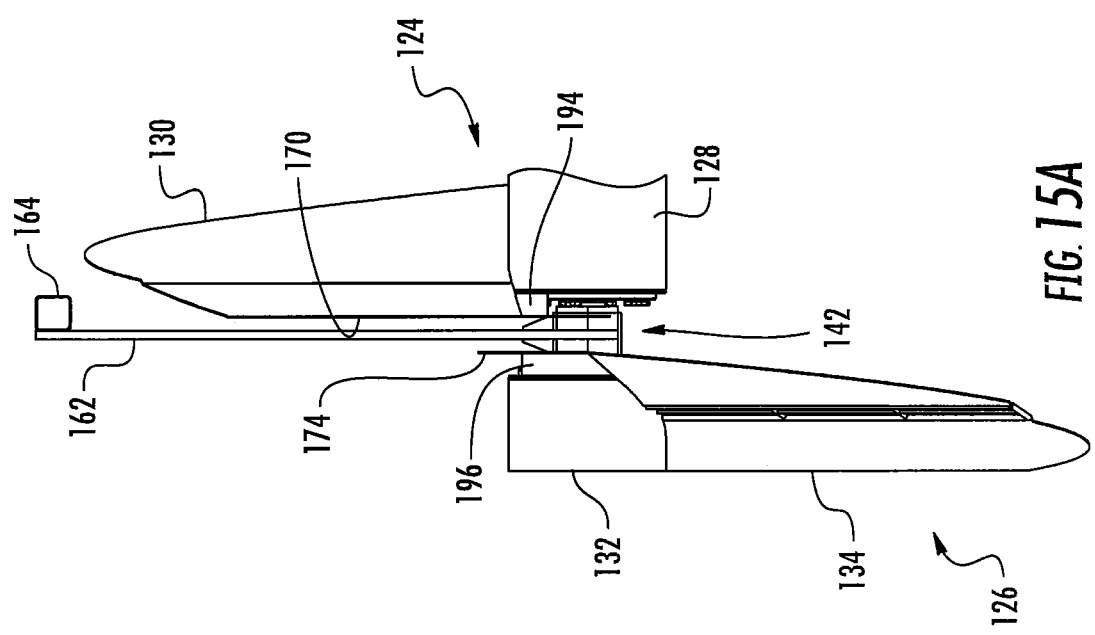

Referring to FIGS. 15A and 15B, a portion of the first flight 130 including the first flight extension 170 may overhang the first auger shaft 128. Similarly, a portion of the second flight 134 including the second flight extension 174 may overhang the second auger shaft 132.

The first flight extension 170 may be at least partially supported by a first support plate 194 that is coupled to the first auger shaft 128 at or adjacent the first auger shaft coupling end 144. Similarly, the second flight extension 174 may be at least partially supported by a second support plate 196 that is coupled to the second auger shaft 132 at or adjacent the second auger shaft coupling end 146. The first and second support plates 194, 196 are configured to rotate with the first and second auger shafts 128, 132, respectively.

The first and second support plates 194, 196 may be arc-shaped. As best seen in FIG. 11, the second support plate 196 may extend to the second flight extension 174, the second flight helical portion 176 and/or a second transition segment 198 that is between the second flight extension 174 and the second flight helical portion 176. Likewise, the first support plate 194 may extend to the first flight extension 170, the first flight helical portion 172 and/or a first transition segment 200 that is between the first flight extension 170 and the first flight helical portion 172.

Referring again to FIG. 15B, it can be seen that the gap G between the first and second flights 130, 134 is substantially reduced due to the configuration with the flight extensions and the first and second flights 130, 134 that overhang the first and second auger shafts 128, 132, respectively. The axial length of the gap G is only constrained by the axial length of the hanger 162 with adequate clearance allowed to the first and second flights to prevent interference as the auger rotates. The axial length of the hanger 162 can be substantially reduced by increasing the width of the hanger 162 as described above.

It will be appreciated that the first and second flights 130, 134 need not overhang the first and second auger shafts 128, 132. For example, a "narrow" bearing assembly such as the one described in reference to FIG. 10 could be employed to effectively narrow the axial spacing between the adjacent auger sections. The flight extensions 170, 174 could be coplanar or substantially coplanar with the first and second shaft coupling ends 144, 146, respectively.

Referring again to FIG. 11, according to some embodiments, the first flight extension 170 and the first transition segment 200 may together be referred to as the "first flight extension" 170 and the second flight extension 174 and the second transition segment 198 may together be referred to as the "second flight extension" 174.

FIGS. 16-24 illustrate features of an auger chiller according to some other embodiments. Many of the features of the embodiments illustrated in FIGS. 5-15 remain the same or substantially the same, and a detailed description of those features is set forth above. The key differences between the embodiments are described below.

Referring to FIGS. 16-19, the flight extensions 170, 174 have a different configuration than as described above. As illustrated, each of the flight extensions 170, 174 includes a plurality of segments. The first flight extension 170 includes a first segment 202 that extends from the first helical portion 172 of the first auger flight 130. The first segment 202 may extend in the same or approximately the same helical path as the first helical portion 172. A second segment 204 bends forward from the helical path at break line 206 (i.e., so that the second segment 204 intersects the auger longitudinal axis A1 more acutely than the first segment 202 intersects the same axis). A third segment 208 extends from the first auger shaft 128 to the second segment 204 and meets the second segment 204 at break line 210. The third segment 208 is angled approximately normal relative to the auger longitudinal axis A1 in the lateral orientation, but angles toward the hanger in the vertical orientation of FIG. 17. The third segment 208 partially overhangs the first auger shaft 128. The first, second and third segments 202, 204, 208 may be integrally formed.

The second flight extension 174 is identical or symmetrical or substantially identical or symmetrical to the first flight extension 170. The first segment 202 of the second flight extension 174 extends from the second helical portion 176 of the second auger flight 134. The third segment 208 extends from the second auger shaft 132 and partially overhangs the second auger shaft 132. According to some other embodiments, the first and second flight extensions 170, 174 are not identical or symmetrical (e.g., one may have different geometry than the other).

The first flight extension 170 at least partially overhangs the first auger shaft 128. Likewise, the second flight extension 174 at least partially overhangs the second auger shaft 132.

The edge of the flight extensions 170, 174 closest to the hanger 162 may be structurally reinforced with an elongated reinforcement member such as a bar, pipe or rod 212. An elongated reinforcement member such as a bar, pipe or rod 212 may also be positioned between the first segments 202 and the helical portions 172, 176. Additionally or alternatively, the flight extensions 170, 174 may be supported with gusset connected to the auger shafts 128, 132. The gussets may connect to the third segments 208 of the flight extensions 170, 174. The elongated members and/or the gussets help ensure that the flights 130, 134 are reinforced to increase the rigidity of the flight as it pushes product through the chiller.

Figure 16:
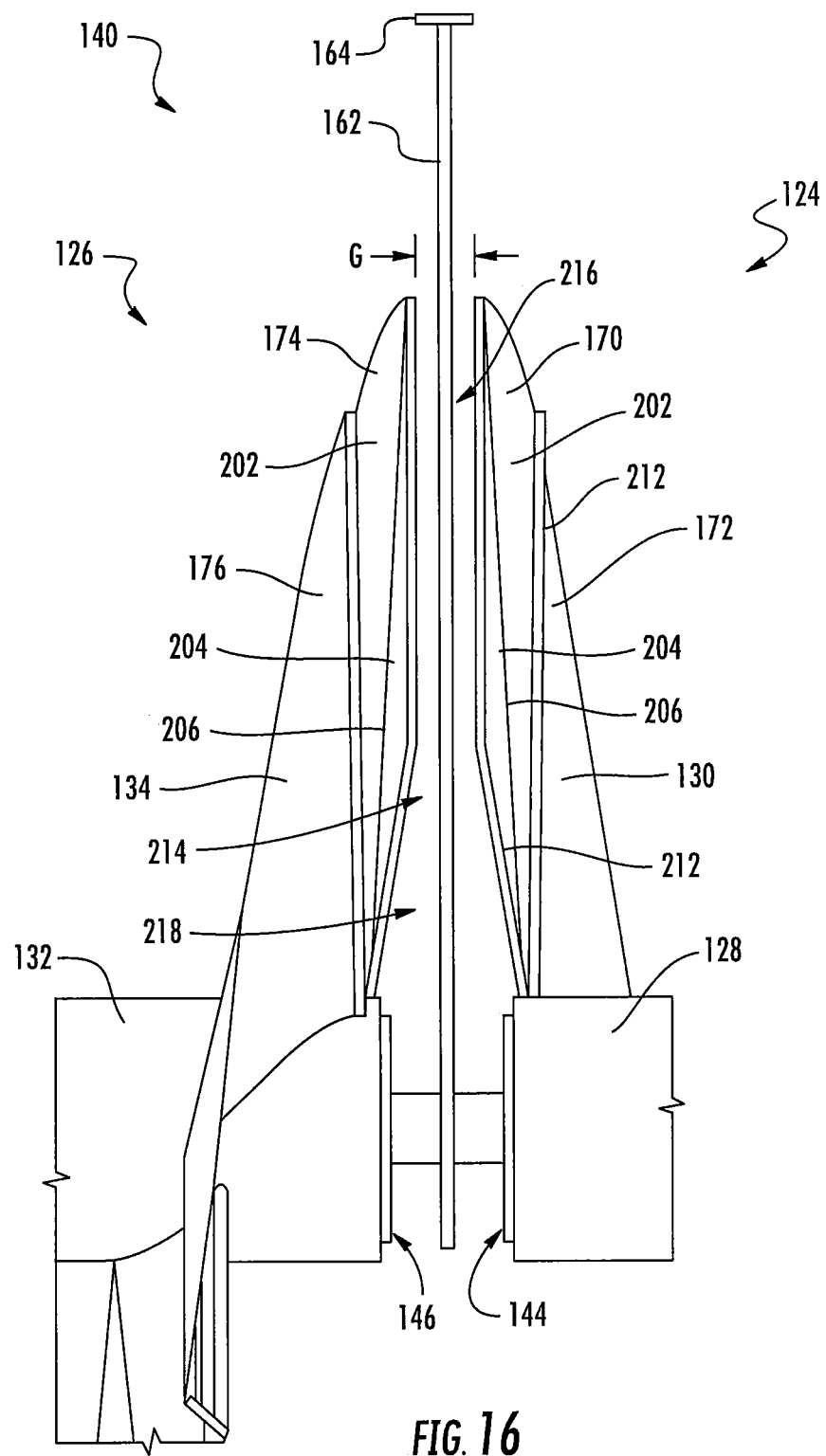
FIG. 16 is a fragmentary side view of first and second auger sections and a hanger bearing assembly according to some other embodiments.

Referring to FIG. 16, when viewed from the side, a gap 214 (which may correspond to the axial gap G) between the upstream and downstream auger sections 124, 126 may resemble a keyhole (or an inverse keyhole). The gap 214 may have a straight or generally straight (upper) portion 216 and a tapered (lower) portion 218 that is wider than the straight portion 216. Specifically, the axial width of the gap 214 at the edges of the auger shafts 128, 132 is larger than the gap 214 at the outer edges of the flights 130, 134. The wider portion of the gap 214 may extend outward radially over approximately the inner one-third (⅓) of the radial extent of the flight extensions 170, 174. In another embodiment, the wider portion of the gap 214 may converge in a linear or nearly linear fashion as the distance from the shaft increases until the narrowest dimension of the gap 214 is realized only near the outer edge of the flight. In another embodiment, the gap 214 may have a stepped configuration with the lower portion 218 having a constant or substantially constant width and the upper portion 216 having a constant or substantially constant width that is narrower than the width of the lower portion 218. There may be a transition portion or section (e.g., a tapered transition portion or section) between the upper and lower portions 216, 218 so as to, for example, eliminate sharp edges. The extra width at the root of the flight allows product that may become pinched between the hanger 162 and the gap in the flight to be pushed through the wider portion of the gap 218 without damage to the product. The present inventor has determined that, while the intent of a narrow gap between auger sections is to prevent product from passing through the gap, in situations where such occurrence is unavoidable, it is preferred to avoid product damage.

Figure 19:
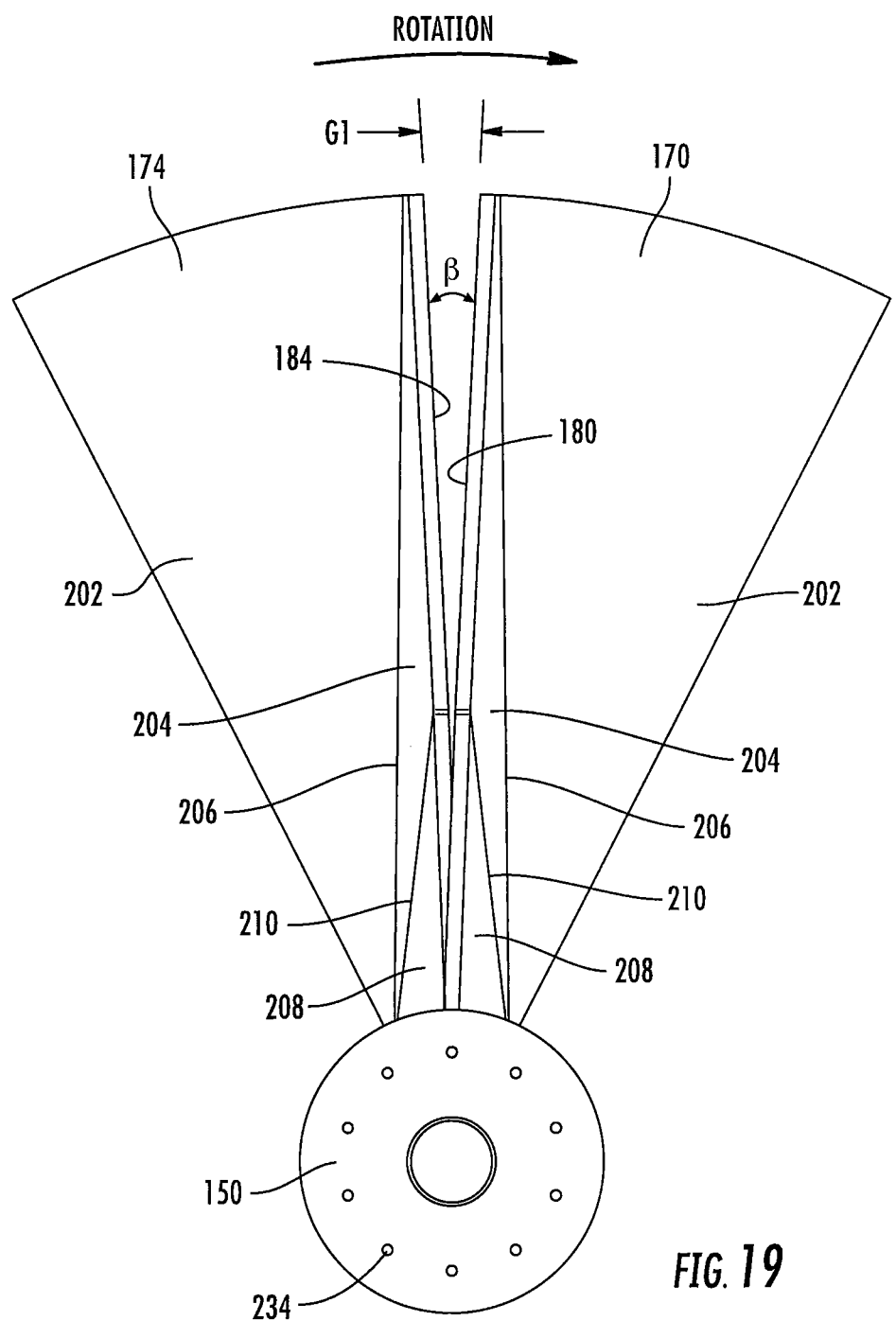
FIG. 19 is an end sectional view of a first flight extension that is part of the first auger section of FIG. 16 and a second flight extension that is part of the second auger section of FIG. 16.

Referring to FIGS. 16 and 19, the gap between the trailing edge 180 of the upstream auger flight 130 and the leading edge 184 of the downstream auger flight 134 can be characterized by two orthogonal dimensions: the axial gap G (FIG. 16) and the circumferential gap G1 (FIG. 19). Ideally, the axial gap G would be just large enough to allow the hanger to pass between the upstream and downstream auger flights. In practice, it is prudent to allow additional clearance to accommodate axial movement of the auger and flight extensions due to changing load and temperature and mechanical drive adjustments. The present inventor has determined that an axial gap G that is approximately 3 inches greater than the hanger axial thickness is generally adequate. Alternatively, the gap G may be less than ⅛ or less than about ⅛ of the pitch of the auger. The hanger may be about ⅜ inches to 1 inch thick. This description of the dimension of the axial gap G refers to the straight portion 216 of the gap 214 (FIG. 16). As described above, the gap 214 may have a larger portion 218 at the root of the flight to allow product to be pushed through the gap 214 without damage.

Figure 26:
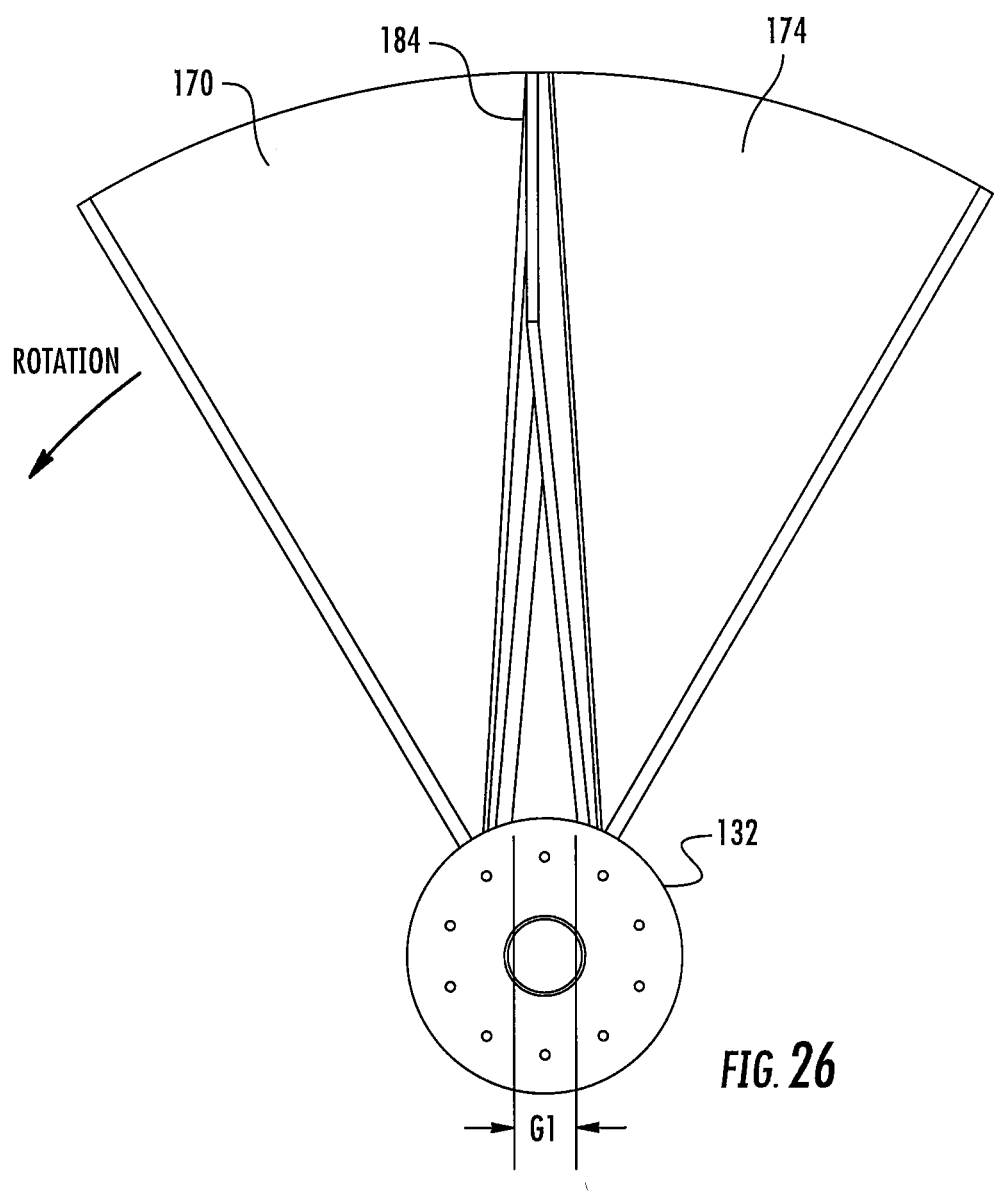
FIG. 26 is an end sectional view illustrating an alternative arrangement from that of FIG. 19 with the trailing edge of the first auger flight spaced apart from the leading edge of the second auger flight at the auger shaft.

The present inventor has determined that the circumferential gap G1 has more latitude for adjustment to meet the needs of particular circumstances (e.g., the size of product in the chiller). The circumferential gap G1 can range from overlapping by up to several inches to a separation of up to 30 degrees (based on the angle β between the trailing edge 180 of the upstream auger flight 130 and the leading edge 184 of the downstream auger flight 134). The circumferential gap G1 is preferably small enough that units of product will not pass through easily. The present inventor has determined that a circumferential gap G1 equal or less to the axial gap G has proven acceptable. According to some embodiments, and as illustrated in FIG. 19, the flight extensions 170, 174 may meet or overlap at bottom portions thereof and may be spaced apart at top portions thereof. According to some other embodiments, and as illustrated in FIG. 26, the circumferential gap G1 may be wider near the shaft and converge to the extent that the flight extensions 170, 174 meet or overlap at the outer edges thereof.

The present inventor has discovered that it is important that the hanger 162 not obstruct the forward path of product on the "pulling side" of the chiller (i.e., the side on which the auger rises as it rotates). This corresponds to the side of the tank 12 to the right of the auger shaft 122 in FIGS. 20 and 21 and to the left of the auger shaft 122 in FIG. 22. Consequently, the hanger 162 should extend no farther laterally than the side of the auger shaft 122 on the pulling side of the chiller. Preferably, the hanger 162 does not extend outside the perimeter of the auger shaft 122 anywhere on the pulling side of the shaft centerline (coinciding with the shaft longitudinal or rotational axis A1).

In addition, the design of the hanger assembly should provide space between the top (or outer) edge of the auger flight and the bottom side of the support member at the leading (or engagement) edge of the hanger. The space or opening should be large enough to allow clearance above the flight for units of product that are pushed to the edge of the flight when the gap in the flight passes by the hanger. Once the product is pushed into the space beyond the flight, it may fall to one side or the other of the flight.

Along these lines, and referring to FIGS. 17 and 20-22, the support member 164 may be generally arch shaped and include a curved lower edge or surface 220. The lower edge 220 and the outer edge 222 of the second auger flight 134 and/or the outer edge 224 of the first auger flight 130 define a gap or opening 226 therebetween. Product can be pushed through the opening 226 as described above.

As product progresses through the chiller, it is desirable to reduce the density of product in the chilling liquid in the vicinity of the hanger bearing. The present inventor discovered that this may be accomplished by increasing the pitch of the auger as it crosses the hanger bearing. Again, pitch is the axial distance between one point on the auger blade or flight to another point exactly one revolution along the flight. The determination of one revolution will ignore any break or discontinuity between one auger section and the next to arrive at the same circumferential position (clock position).

FIG. 23 illustrates an arrangement in which the pitch P across the hanger bearing 142 is the same as the pitch P of the first upstream flight 130 and the pitch P of the second downstream flight 134. The projections of the outer edges of the first and second flights 130, 134 coincide as indicated by the dashed line. That is, the first and second flights 130, 134 are rotationally aligned on the same helix.

Figure 24:
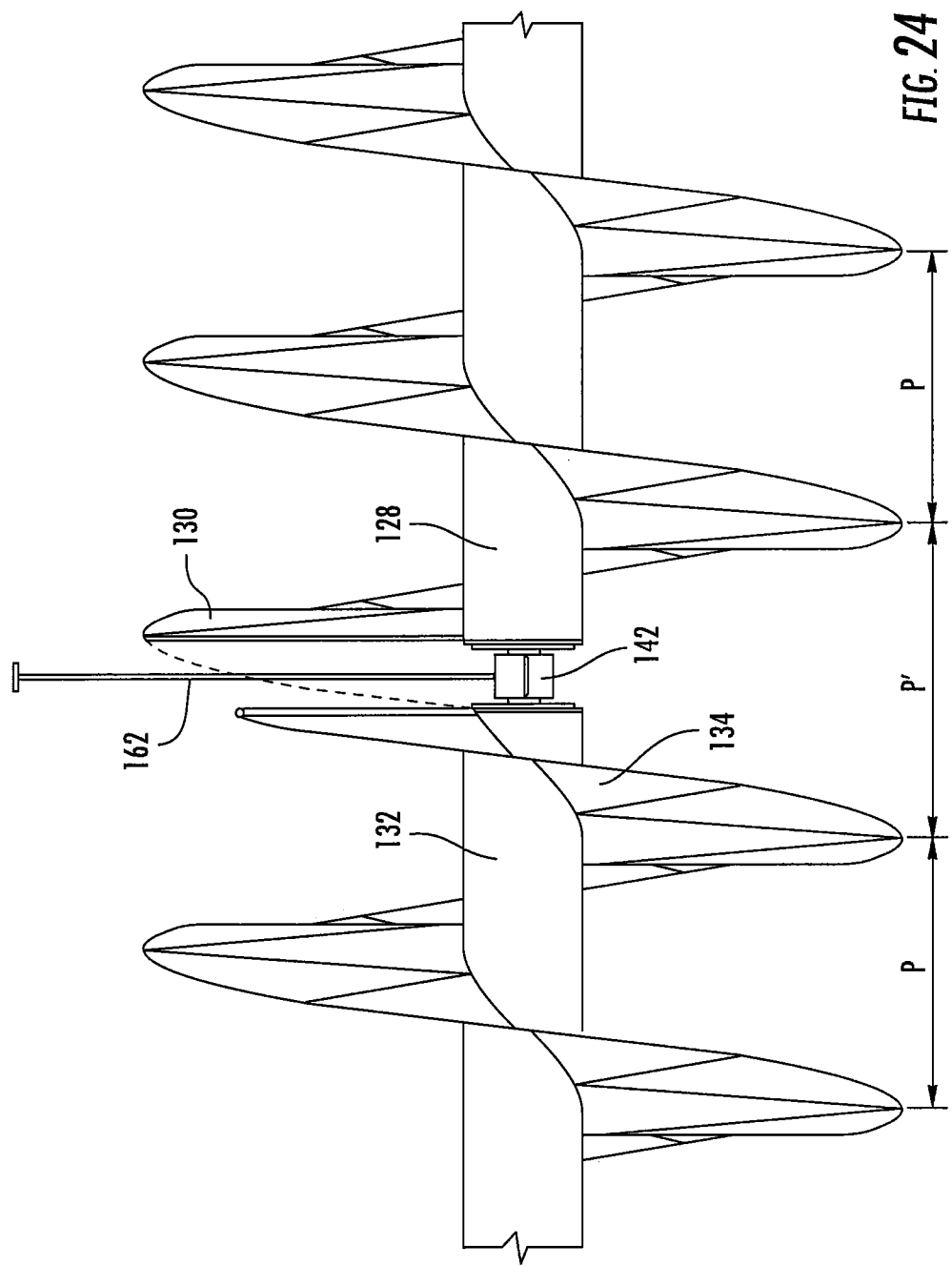
FIG. 24 is a fragmentary side view of first and second auger sections and a hanger bearing assembly with the pitch across the hanger bearing assembly larger than the pitch of the upstream and downstream auger flights to reduce the density of product around the hanger bearing assembly during operation of the auger.

FIG. 24 illustrates an arrangement according to some embodiments of the invention in which the pitch P' between the first and second flights 130, 134 is increased. The pitch P' is increased by changing the rotational alignment of the upstream and downstream auger sections relative to one another. For example, the normal pitch P along the length of the auger may be 42 inches while the pitch P' between the upstream and downstream sections may be about 47 inches. Once the rotational alignment has been adjusted to achieve the desired pitch, the flight extensions can be laid out to provide the desired gap configuration.

Figure 27:
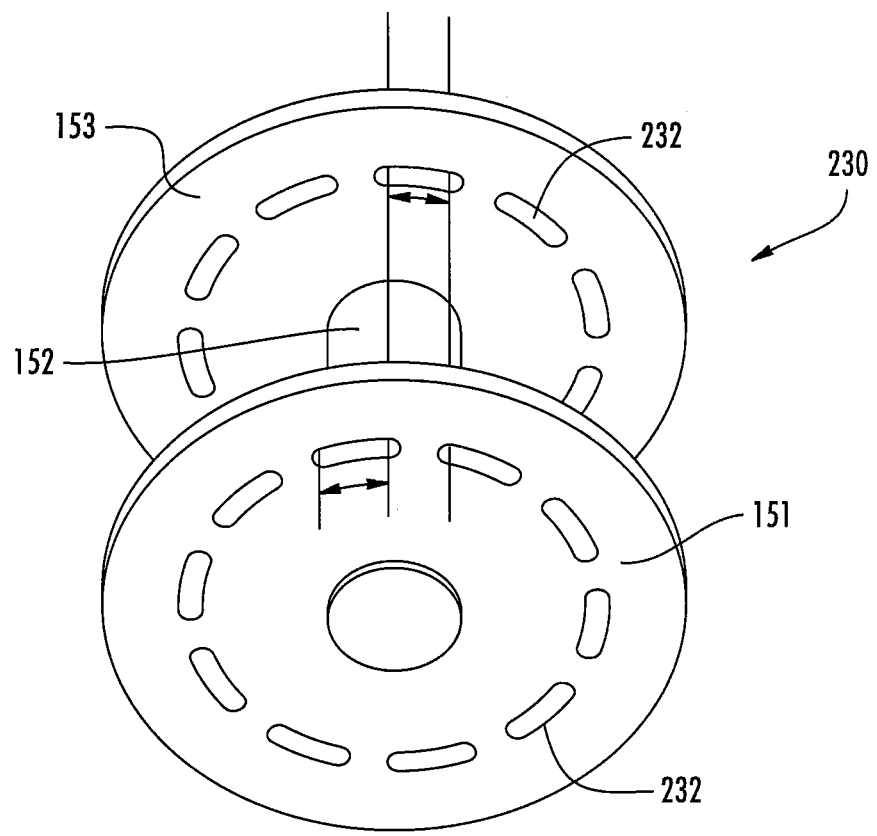
FIG. 27 is a perspective view of a coupling shaft assembly according to some embodiments.

In instances where a conventional auger chiller is being modified to employ the advantages of the current invention, the coupling shaft 152 may be configured to allow adjustment of the rotational alignment between a first auger section 124 (or first auger shaft 128) and a second auger section 126 (or second auger shaft 132). One such embodiment is shown in FIG. 27. A coupling shaft assembly 230 includes the coupling shaft 152, a first coupling flange 151 for coupling to the first auger shaft end plate 148, and a second coupling flange 153 for coupling to the second auger shaft end plate 150. Each coupling flange is provided with a plurality of slots 232 laid out in a circular pattern having a radius that matches the radius of the bolting circle defined by a plurality of bolt holes 234 on the auger end plates 148, 150 (FIG. 19 illustrates the holes 234 in the end plate 150 and it will be appreciated that holes 234 are likewise defined in the end plate 148). The length of each slot 232 extends along the bolting circle. Coupling bolts may be inserted through the slots 232 and into receiving holes 234 on the auger end plates 148, 150. The length of the slots allows adjustment in the rotational alignment of the first auger section 124 relative to the second auger section 126. The position of the slots 232 may optionally be staggered circumferentially in the second coupling flange 153 relative to slots 232 in the first coupling flange 151 to increase the range of adjustment afforded by the slots.

In other embodiments, one or both of the coupling shaft flanges 151, 153 may have a plurality of round holes instead of slots. For example, a flange could have more (e.g., twice as many) holes spaced around the bolting circle as there are bolt holes 234 in the auger end plates 148, 150. By choosing which holes are used to couple the coupling shaft to an auger end plate, the rotational alignment of the first and second auger sections could be altered. Those skilled in the art will understand that other methods may be used to rotationally couple the auger sections while allowing some flexibility for rotational alignment.

Some embodiments of the invention are directed to a kit for modifying or retrofitting a conventional auger chiller. The kit may include a first flight extension 170 for connecting (e.g., welding) to a helical flight of a first auger section and/or a second flight extension 174 for connecting (e.g., welding) to a helical flight of a second auger section. The kit may include a hanger bearing assembly 142 as described herein. The kit may include a hanger 162 as described herein. The kit may include the coupling shaft assembly 230 described above.

Figure 28:
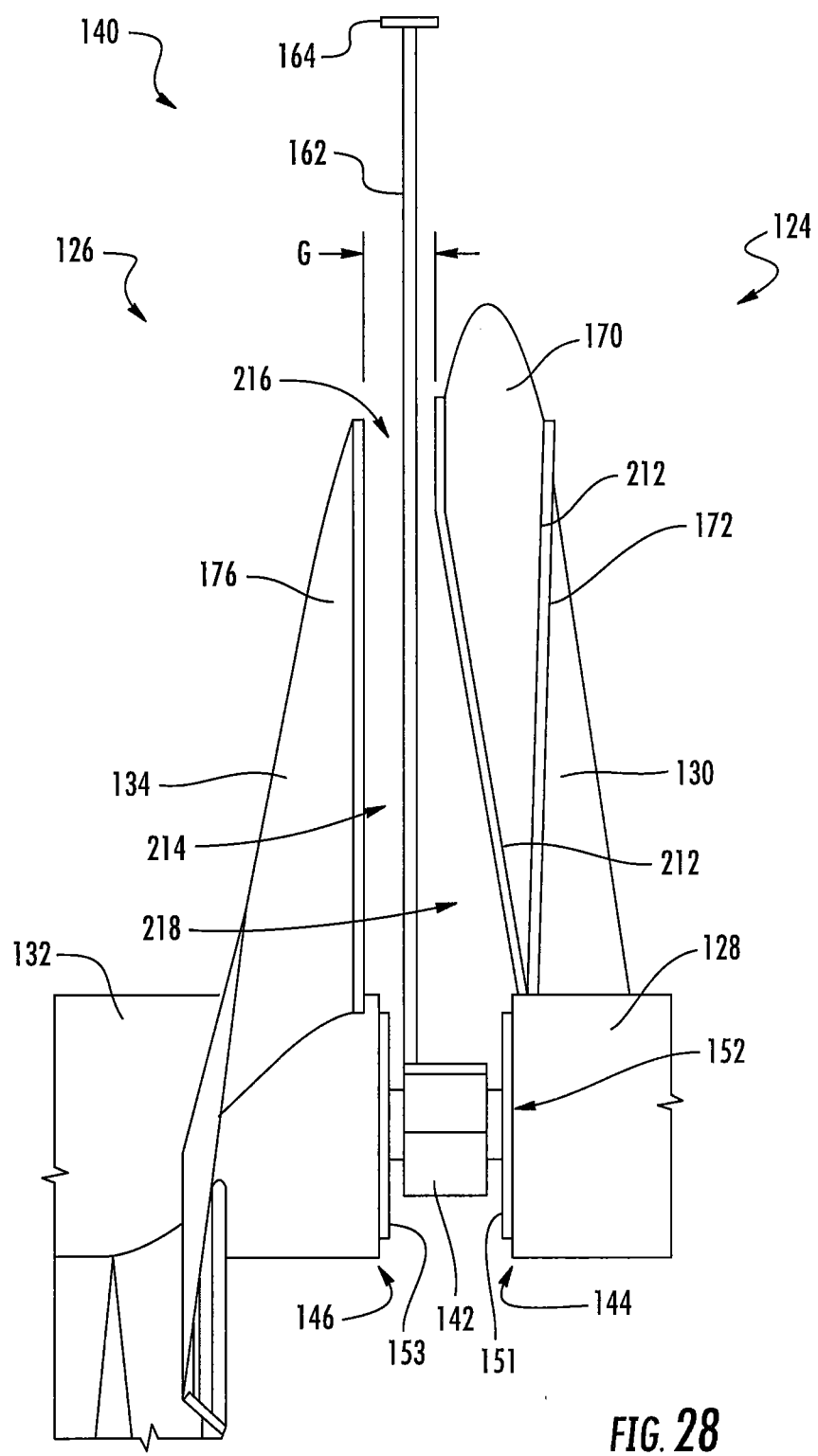
FIG. 28 is a fragmentary side view of first and second auger sections and a hanger bearing assembly according to some other embodiments.

Several of the embodiments described herein include a first flight extension 170 and a second flight extension 174. In some embodiments, only one flight extension 170 or 174 is required to meet the intent of the current invention. For example, as illustrated in FIG. 28, the hanger 162 may be offset to one end of the bearing assembly 142. In the offset position, the hanger is spaced closely to the second helical portion 176 of the second auger section 126 without resort to any extension. The first flight extension 170 is employed as has been described to overhang the end of the first auger shaft 128 by an amount that exceeds the overhang required if the hanger 162 were deployed at the center of the bearing assembly. In this manner, the size of the axial gap G is reduced to an acceptable value with only one flight extension. Similar results could be achieved by employing a flight extension only on the second auger section while no extension is applied to the first auger section.

Several features related to the flight extensions 170, 174 have been described in the present application. For example, the flight extensions 170, 174 may extend from helical portions 172, 176 of flights 130, 134. A respective flight extension may overhang the end of the shaft. Also, the trailing edge 180 of the first flight extension 170 may be separated from the leading edge 184 of the second flight extension 174 by a gap that has an axial dimension G and a circumferential dimension G1. A preferred pitch P' between the first auger flight 130 and the second auger flight 134 has been described. It will be understood that not all of these features are required in every embodiment. Any configuration of the flight extensions which satisfies essential requirements as described herein falls within the intent and scope of the present invention. For example, the flight extensions need not conform to a helical disposition about the auger shaft, nor must they be disposed perpendicular to the axis A1 provided other relevant requirements as described herein are met.

FIGS. 29-32 illustrate features of an auger chiller according to some other embodiments. Many of the features of the embodiments illustrated in FIGS. 6-28 remain the same or substantially the same, and a detailed description of those features is set forth above. The key differences between the embodiments are described below.

Figure 29:
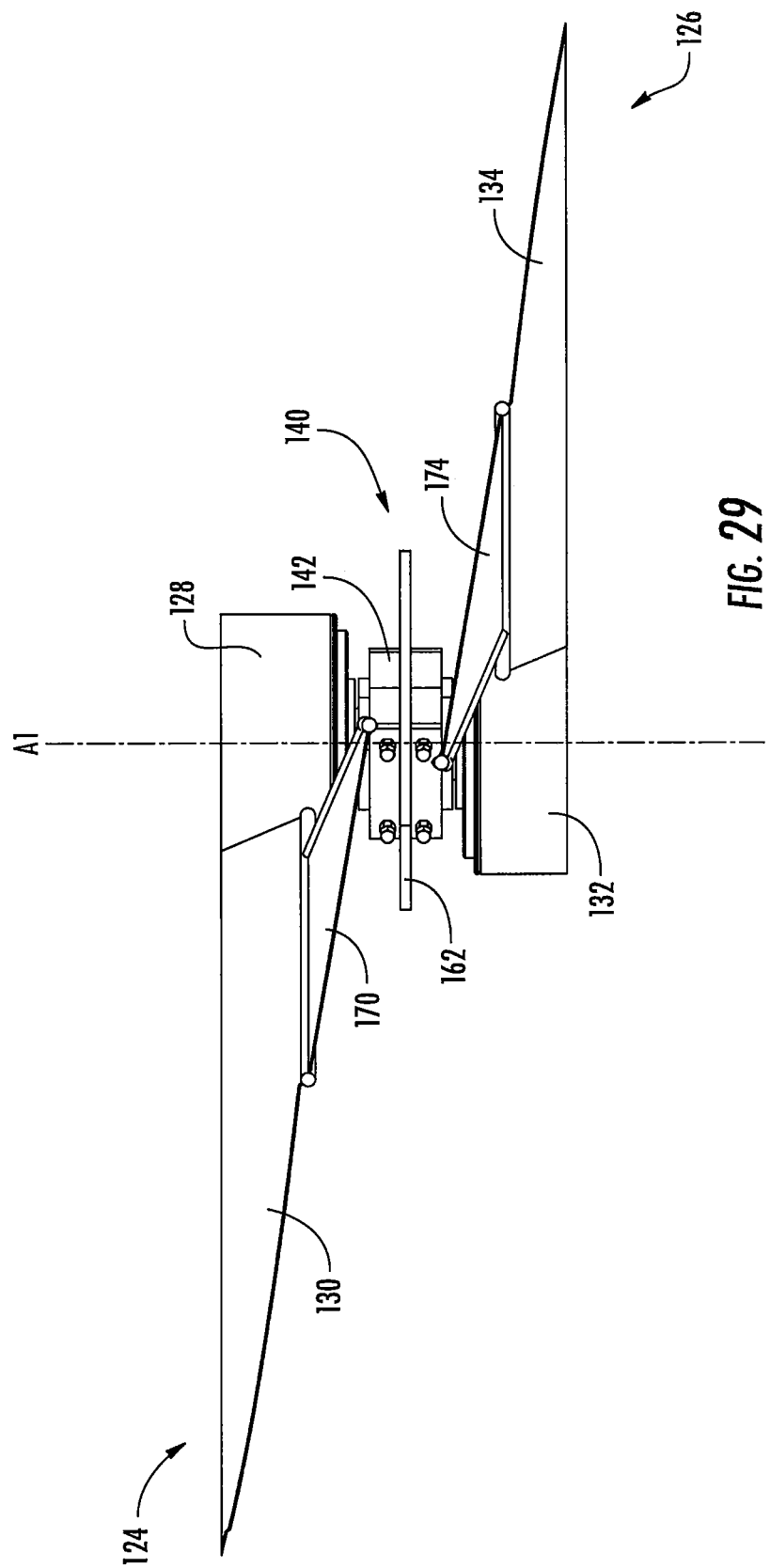
FIG. 29 is a fragmentary top view of first and second auger sections and a hanger bearing assembly according to some other embodiments.
Figure 30:
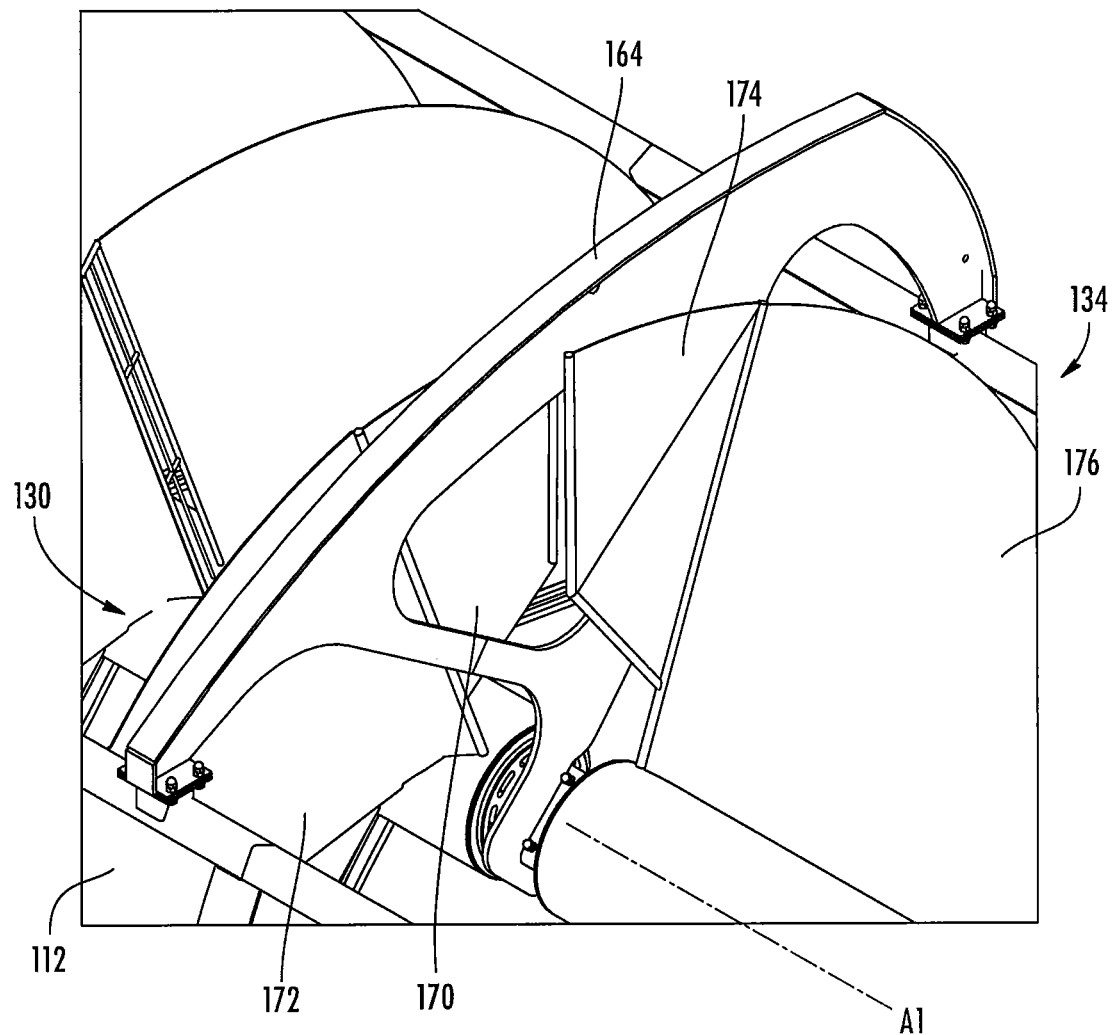
FIG. 30 is a fragmentary perspective view of the second auger section and the hanger bearing assembly of FIG. 29.
Figure 31:
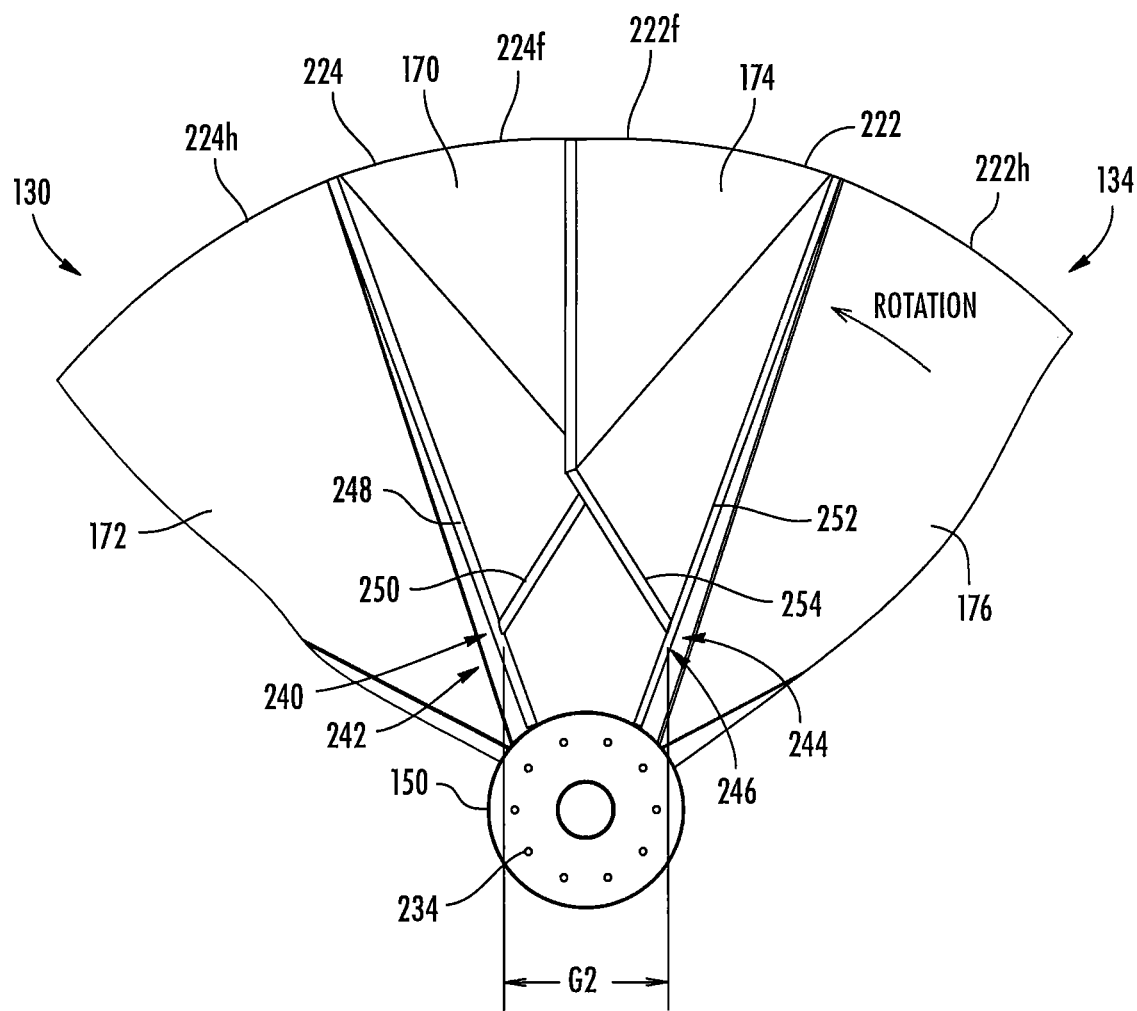
FIG. 31 is a fragmentary end sectional view of the first and second auger sections of FIG. 29.
Figure 32:
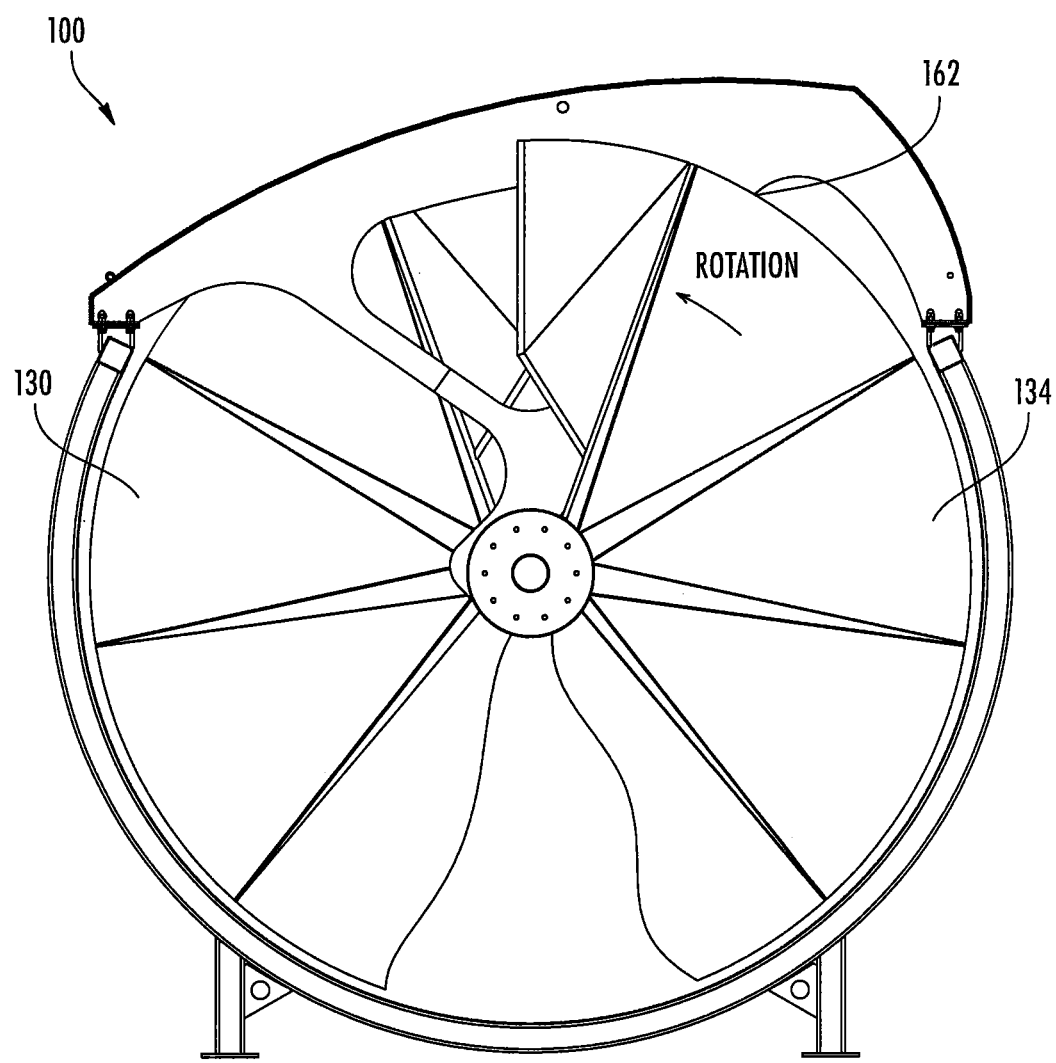
FIG. 32 is an end sectional view directed toward the inlet of a chiller including the first and second auger sections and the hanger bearing assembly of FIG. 29 with the first and second auger sections being rotated.

Referring to FIG. 31, the flight extension 170 extends radially between an outer edge 224h of the helical portion 172 of the first auger flight 130 and a first point 240 at an inner portion 242 of the helical portion 172. The first point 240 is spaced apart from the first auger shaft 128 (FIG. 29). The first point 240 may be closer to the first auger shaft 128 than the outer edge 224h of the helical portion 172. In some embodiments, the distance from the first auger shaft 128 to the first point 240 is about ⅓ the distance from the first auger shaft 128 to the outer edge 224h of the helical portion 172.

Similarly, the flight extension 174 extends radially between an outer edge 222h of the helical portion 176 of the second auger flight 134 and a second point 244 at an inner portion 246 of the helical portion 176. The second point 244 is spaced apart from the second auger shaft 232 (FIG. 29). The second point 244 may be closer to the second auger shaft 132 than the outer edge 222h of the helical portion 176. In some embodiments, the distance from the second auger shaft 132 to the second point 244 is about ⅓ the distance from the second auger shaft 132 to the outer edge 222h of the helical portion 176.

The present inventor has determined that, for larger product (e.g., turkeys), it may be desirable to have a larger circumferential gap to allow units of product to pass therethrough. As best seen in FIG. 31, the configuration described above provides a circumferential gap G2 that has an increased maximum width. The maximum width may be between the first and second points 240, 244.

The flight extension 170 may be coupled (e.g., welded) to the helical portion 172. There may be a terminal rod 248 on a radial edge of the helical portion 172, and the flight extension 170 may be coupled to the terminal rod 248. Alternatively, the flight extension 170 and at least a portion of the helical portion 172 may be monolithic. One or more terminal rods 250 may optionally be on an open or otherwise unattached edge of the flight extension 170. The flight extension 170 and the helical portion 172 (or the inner portion 242 thereof) may define the trailing edge of the first flight 130.

Similarly, the flight extension 174 may be coupled (e.g., welded) to the helical portion 176. There may be a terminal rod 252 on a radial edge of the helical portion 176, and the flight extension 174 may be coupled to the terminal rod 252. Alternatively, the flight extension 174 and at least a portion of the helical portion 176 may be monolithic. One or more terminal rods 254 may optionally be on an open or otherwise unattached edge of the flight extension 174. The flight extension 174 and the helical portion 176 (or the inner portion 246 thereof) may define the leading edge of the second flight 134.

The circumferential gap G2 may widen from the first and second auger shafts 128, 132 (FIG. 29) to the first and second points 240, 244. The circumferential gap G2 may narrow from the first and second points 240, 244 toward outer edges 224f, 222f of the first and second flight extensions 170, 174 (or outer edges 224, 222 of the first and second flights 130, 134). In some embodiments, the first and second flight extensions 170, 174 (or first and second flights 130, 134) may overlap at the outer edges 224f, 222f of the first and second flight extensions 170, 174 (or outer edges 224, 222 of the first and second flights 130, 134). In other embodiments, a circumferential gap (not illustrated, but analogous to G1 of FIG. 19) may exist between the first and second flight extensions 170, 174 (or first and second flights 130, 134). This gap will generally be smaller in extent than gap G2 at first and second points 240, 244.

The first auger flight 130 may include the first helical portion 172 that is helically disposed on the first auger shaft 128 and the first flight extension 170 that extends approximately circumferentially away from the first helical portion 172. Similarly, the second auger flight 134 may include the second helical portion 176 that is helically disposed on the second auger shaft 132 and the second flight extension 174 that extends approximately circumferentially away from the second helical portion 176. As used herein, the first (or second) flight extension that "extends approximately circumferentially away" from the first (or second) helical portion means that the flight extension extends between a plane normal to the shaft axis and a continuation of the helical path of the flight.

Although chillers having first and second auger sections have been described in detail, it will be appreciated that chillers having more than two auger section are within the scope of the invention. For example, a chiller may have three auger sections. A central auger section could be coupled to two outer auger sections (e.g., using two coupling shafts and two hanger bearing assemblies as described herein), and the two outer auger sections could be coupled to the tank at or adjacent opposite end walls.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A poultry chiller comprising:
   an elongated tank;
   an auger rotatably held lengthwise in the tank and defining a longitudinal axis, the auger comprising:
   a first auger section comprising a first auger shaft and a first auger flight that extends radially away from the first auger shaft, the first auger flight comprising a first helical portion that is helically disposed on the first auger shaft and a first flight extension that extends approximately circumferentially away from the first helical portion; and
   a second auger section comprising a second auger shaft and a second auger flight that extends radially away from the second auger shaft, the second auger flight comprising a second helical portion that is helically disposed on the second auger shaft and a second flight extension that extends approximately circumferentially away from the second helical portion;
   a coupling shaft coupling a first coupling end of the first auger shaft and an adjacent second coupling end of the second auger shaft; and
   a hanger bearing assembly comprising a bearing assembly supporting the coupling shaft, a support member coupled to an upper portion of the tank, and a hanger extending between the bearing assembly and the support member;
   wherein the first auger flight overhangs the first coupling end of the first auger shaft and the second auger flight overhangs the second coupling end of the second auger shaft.

2. The poultry chiller of claim 1 wherein, as the auger rotates in the tank, the hanger passes through an axial gap defined by the first and second flight extensions, and wherein the axial gap has a greater axial length at the first and second auger shafts than at outer edges of the first and second flight extensions.

3. The poultry chiller of claim 2 wherein the axial gap comprises a first portion extending radially away from the first and second auger shafts and a second portion extending radially away from the first portion of the axial gap to the outer edges of the first and second flight extensions, and wherein the axial length of the first portion of the axial gap decreases from the first and second auger shafts to the second portion of the axial gap.

4. The poultry chiller of claim 1 wherein, as the auger rotates in the tank, a leading edge of the second flight extension and an engagement edge of the hanger are configured to urge product caught therebetween radially outwardly toward an outer edge of the first auger flight and/or an outer edge of the second auger flight.

5. The poultry chiller of claim 4 wherein the engagement edge of the hanger is arcuate.

6. The poultry chiller of claim 4 wherein the leading edge of the second flight extension is substantially straight and defines an offset angle with a projection extending radially away from the longitudinal axis of the auger.

7. The poultry chiller of claim 6 wherein the offset angle is at least 20 degrees.

8. The poultry chiller of claim 4 wherein a lower surface of the support member and the outer edge of the first auger flight and/or the outer edge of the second auger flight define an opening that is sized to allow product urged radially outwardly to pass therethrough.

9. The poultry chiller of claim 1 wherein a trailing edge of the first auger flight and a leading edge of the second auger flight define a circumferential gap therebetween.

10. The poultry chiller of claim 9 wherein the circumferential gap varies in width from the first and second auger shafts to outer edges of the first and second auger flights.

11. The poultry chiller of claim 10 wherein:
the leading edge and the trailing edge meet or overlap at one of the first and second auger shafts and the outer edges of the first and second flights; and
the leading edge and the trailing edge are spaced apart at the other one of the first and second auger shafts and the outer edges of the first and second flights.

12. The poultry chiller of claim 1 wherein the first and second flight extensions overlap when viewed along the auger longitudinal axis.

13. The poultry chiller of claim 1 wherein an angle of engagement of at least 30 degrees is defined between a leading edge of the second flight extension and an engagement edge of the hanger.

14. The poultry chiller of claim 1 wherein, as the auger rotates in the tank, the hanger passes through a gap defined by the first and second flights, and wherein an axial dimension of the gap has a greater length at the first and second auger shafts than at outer edges of the first and second flights.

15. The poultry chiller of claim 14 wherein a circumferential dimension of the gap has a greater length at the first and second auger shafts than at the outer edges of the first and second flights.

16. A kit for a poultry chiller comprising an elongated tank and an auger rotatably held lengthwise in the tank and including a first auger section and a second auger section, the kit comprising:

a first flight extension that is configured to connect to a first helical portion of a first auger flight that is helically disposed on a first auger shaft of the first auger section; and a coupling shaft assembly comprising a first coupling flange configured to couple to a first end plate of the first auger shaft and a second coupling flange configured to couple to an adjacent second end plate of a second auger shaft of the second auger section;

wherein the first and second coupling flanges are configured to allow adjustment of a rotational alignment between the first and second auger sections.

17. The kit of claim 16 wherein:
the first coupling flange comprises a plurality of elongated slots defined therein and arranged in a circular pattern, the plurality of elongated slots configured to be aligned with a plurality of receiving holes defined in the first end plate of the first auger shaft; and
the second coupling flange comprises a plurality of elongated slots defined therein and arranged in a circular pattern, the plurality of slots configured to be aligned with a plurality of receiving holes defined in the second end plate of the second auger shaft.

18. The kit of claim 17 wherein the plurality of elongated slots of the first coupling flange and the plurality of elongated slots of the second coupling flange are circumferentially offset from one another.

19. The kit of claim 16 wherein, when the first flight extension is connected to the first helical portion of the first auger flight, the first flight extension overhangs the first end plate of the first auger shaft.

20. The kit of claim 16 further comprising a second flight extension that is configured to connect to a second helical portion of a second auger flight that is helically disposed on the second auger shaft of the second auger section.

21. The kit of claim 16 further comprising a hanger bearing assembly comprising a bearing assembly configured to support the coupling shaft assembly and a hanger configured to extend between the bearing assembly and a support member coupled to an upper portion of the tank.

22. A poultry chiller comprising:
an elongated tank;
an auger rotatably held lengthwise in the tank and defining a longitudinal axis, the auger comprising:
a first auger section comprising a first auger shaft and a first auger flight that extends radially away from the first auger shaft, the first auger flight comprising a first helical portion that is helically disposed on the first auger shaft and a first flight extension that extends away from the first helical portion; and
a second auger section comprising a second auger shaft and a second auger flight that extends radially away from the second auger shaft, the second auger flight comprising a second helical portion that is helically disposed on the second auger shaft and a second flight extension that extends away from the second helical portion;
a coupling shaft coupling a first coupling end of the first auger shaft and an adjacent second coupling end of the second auger shaft; and
a hanger bearing assembly comprising a bearing assembly supporting the coupling shaft, a support member coupled to an upper portion of the tank, and a hanger extending between the bearing assembly and the support member;

wherein a pitch or axial length between the first and second auger flights across the hanger bearing assembly is greater than a pitch of each of the first and second helical portions of the first and second auger flights.

* * * * *